(12) United States Patent
Ohtsubo et al.

(10) Patent No.: US 10,362,249 B2
(45) Date of Patent: Jul. 23, 2019

(54) IMAGE CAPTURING DEVICE, IMAGE CAPTURING METHOD, CAPABLE OF IMPROVING TRACKABILITY OF FOCUS POSITION AND FOCUSING ACCURACY WITH RESPECT TO SUBJECT

(71) Applicant: SONY CORPORATION, Tokyo (JP)

(72) Inventors: Shinichi Ohtsubo, Kanagawa (JP); Takeshi Akabane, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/745,543

(22) PCT Filed: Apr. 26, 2016

(86) PCT No.: PCT/JP2016/063109
§ 371 (c)(1),
(2) Date: Jan. 17, 2018

(87) PCT Pub. No.: WO2017/022283
PCT Pub. Date: Feb. 9, 2017

(65) Prior Publication Data
US 2018/0213172 A1    Jul. 26, 2018

(30) Foreign Application Priority Data

Jul. 31, 2015    (JP) .................................. 2015-152079

(51) Int. Cl.
*H04N 5/369*    (2011.01)
*G02B 7/34*    (2006.01)
(Continued)

(52) U.S. Cl.
CPC ............. *H04N 5/3696* (2013.01); *G02B 7/34* (2013.01); *G02B 7/365* (2013.01); *G03B 13/36* (2013.01);
(Continued)

(58) Field of Classification Search
CPC ................. H04N 5/3696; H04N 5/232; H04N 5/232123; H04N 5/232122;
(Continued)

(56) References Cited

U.S. PATENT DOCUMENTS 8,730,374 B2 *   5/2014   Sugawara .............. G02B 7/285
                                                          348/231.3
2006/0008265 A1   1/2006   Ito
(Continued)

FOREIGN PATENT DOCUMENTS

CN         1721970 A      1/2006
CN       103095985 A      5/2013
(Continued)

OTHER PUBLICATIONS

International Search Report and Written Opinion of PCT Application No. PCT/JP2016/063109, dated Aug. 2, 2016, 09 pages of ISRWO.

*Primary Examiner* — Luong T Nguyen
(74) *Attorney, Agent, or Firm* — Chip Law Group

(57) ABSTRACT

[Object] To improve both trackability of a focus position and focusing accuracy with respect to a subject. [Solution] An image capturing device includes: an imaging element having a light receiving surface including detection pixels that receive light passed through different regions of an exit pupil of an imaging optical system, and detect a phase difference between two images obtained by splitting the exit pupil; a first detection unit configured to execute at least any of first focus detection based on a phase detection autofocus (AF) method and second focus detection based on a contrast detection AF method; a focusing control unit configured to drive at least one optical member included in the imaging optical system toward a focusing position detected by the focus detection; and a second detection unit configured to detect a change in a subject image. In a case where a state (Continued)

in which a change amount of the subject image is less than a threshold continues for a predetermined period of time or more after the first focus detection, the first detection unit executes the first focus detection or the second focus detection.

8 Claims, 19 Drawing Sheets

(51) Int. Cl.
  *G03B 13/36* (2006.01)
  *H04N 5/232* (2006.01)
  *G02B 7/36* (2006.01)
(52) U.S. Cl.
  CPC . *H04N 5/232122* (2018.08); *H04N 5/232123* (2018.08); *H04N 5/36961* (2018.08)
(58) Field of Classification Search
  CPC ...... H04N 5/36961; G03B 13/36; G02B 7/34; G02B 7/28; G02B 7/36; G02B 7/365
  See application file for complete search history.

(56) References Cited

U.S. PATENT DOCUMENTS

| | | | |
|---|---|---|---|
| 2007/0153112 A1* | 7/2007 | Ueda | G03B 19/12 348/335 |
| 2012/0274837 A1* | 11/2012 | Yamasaki | G02B 7/285 348/360 |
| 2013/0107067 A1 | 5/2013 | Miyakoshi | |
| 2013/0120609 A1* | 5/2013 | Okazawa | H04N 5/23212 348/223.1 |
| 2014/0320734 A1* | 10/2014 | Funatsu | H04N 5/3456 348/349 |
| 2015/0124157 A1 | 5/2015 | Hongu et al. | |

FOREIGN PATENT DOCUMENTS

| | | |
|---|---|---|
| EP | 1617652 A2 | 1/2006 |
| JP | 2006-053545 A | 2/2006 |
| JP | 2010-256824 A | 11/2010 |
| JP | 2013-097136 A | 5/2013 |
| JP | 2013-160991 A | 8/2013 |
| JP | 5400396 B2 | 1/2014 |
| JP | 2014-126858 A | 7/2014 |
| JP | 2015-087704 A | 5/2015 |

* cited by examiner

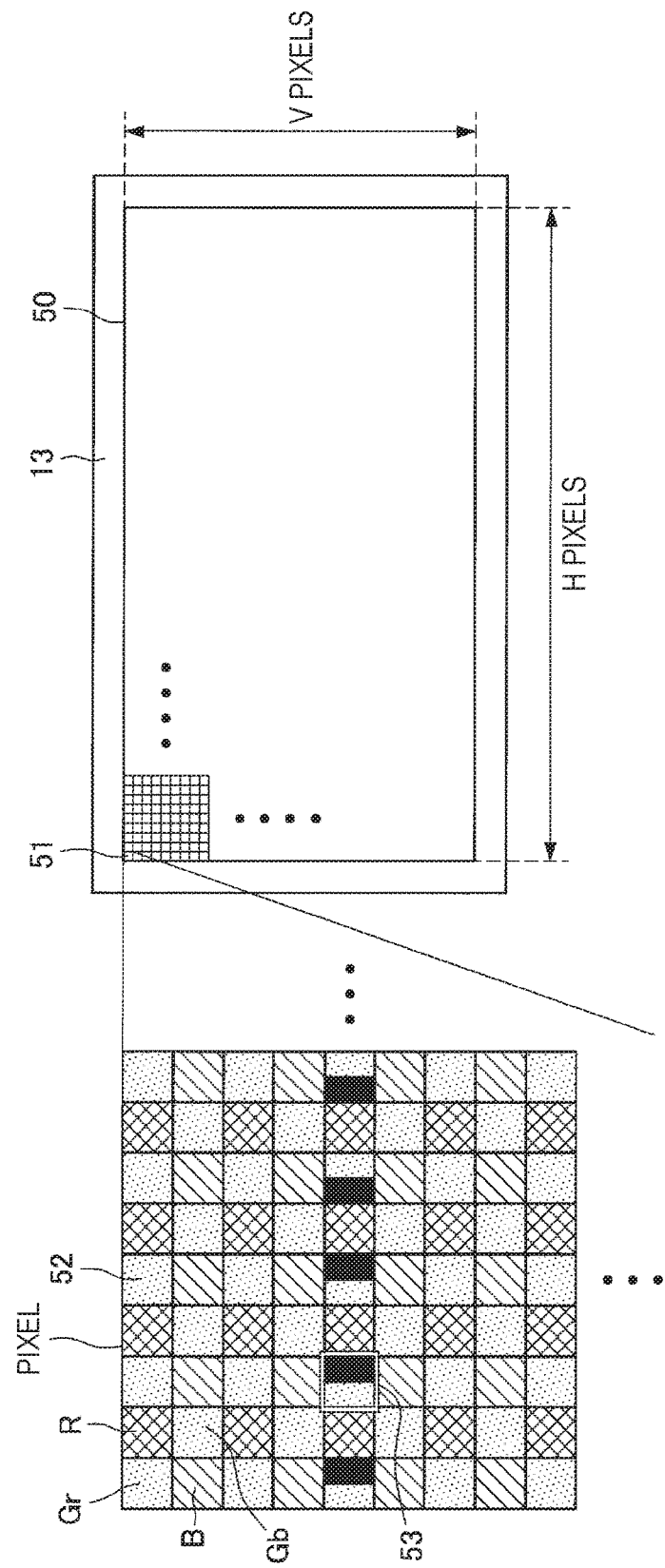

FIG. 2B
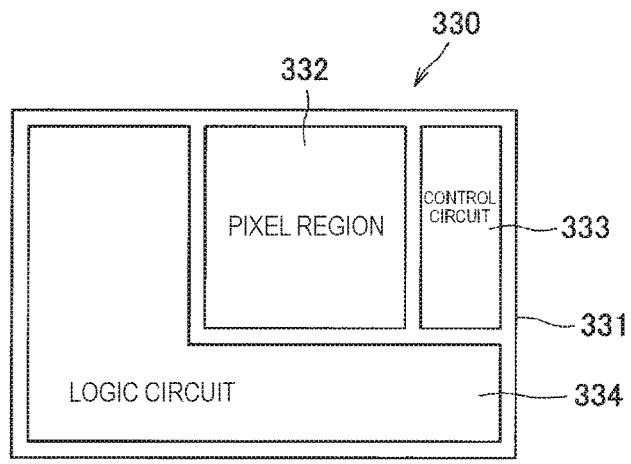
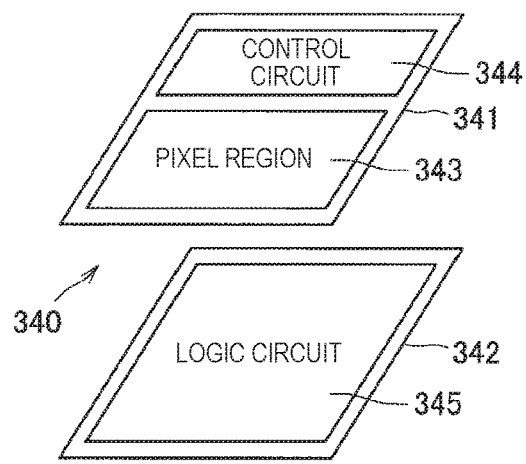
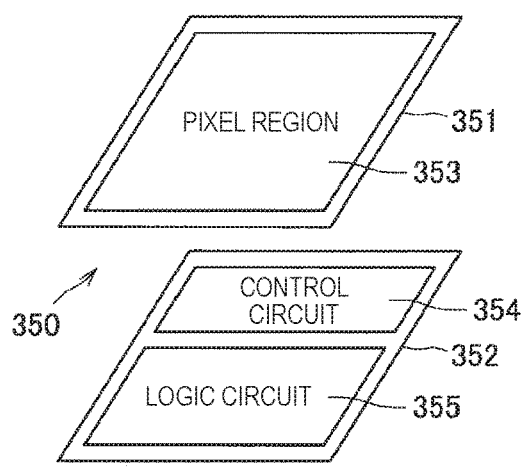

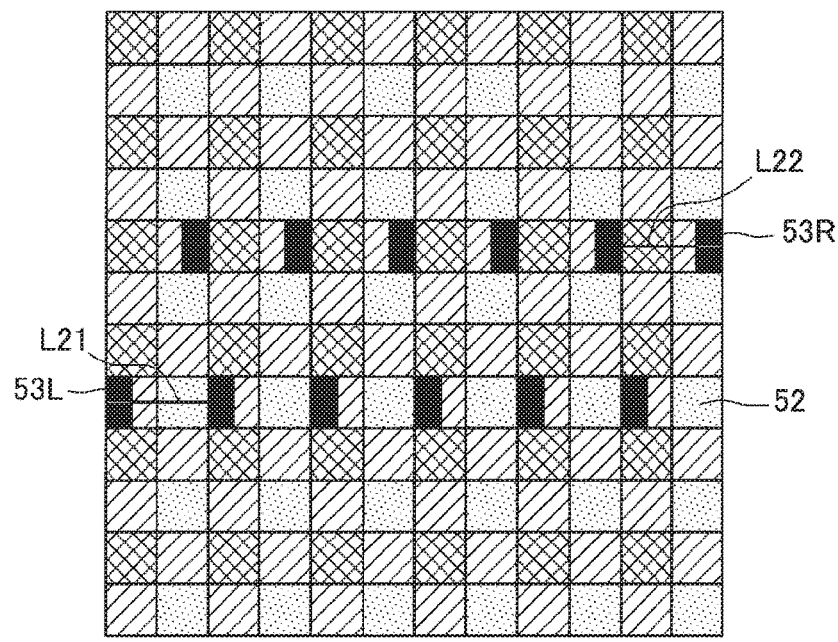
FIG. 4A
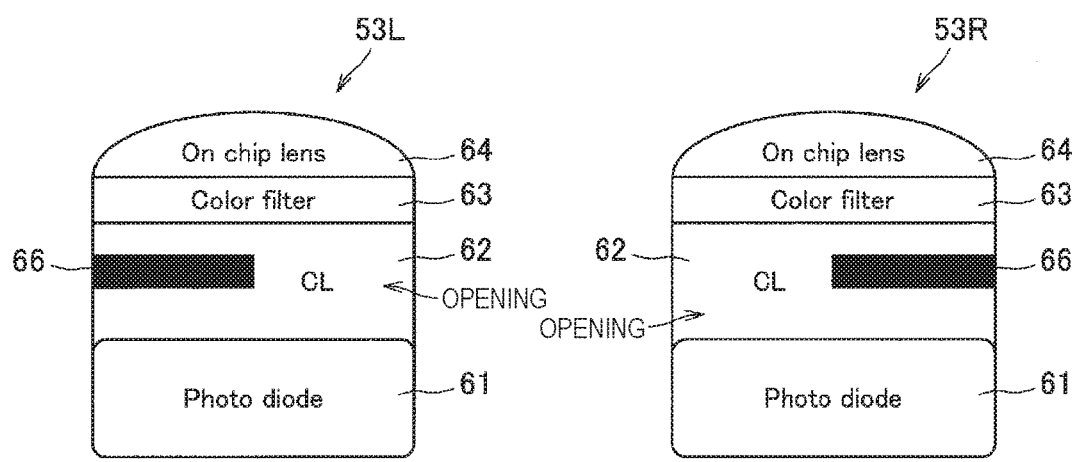
FIG. 4B
FIG. 4C

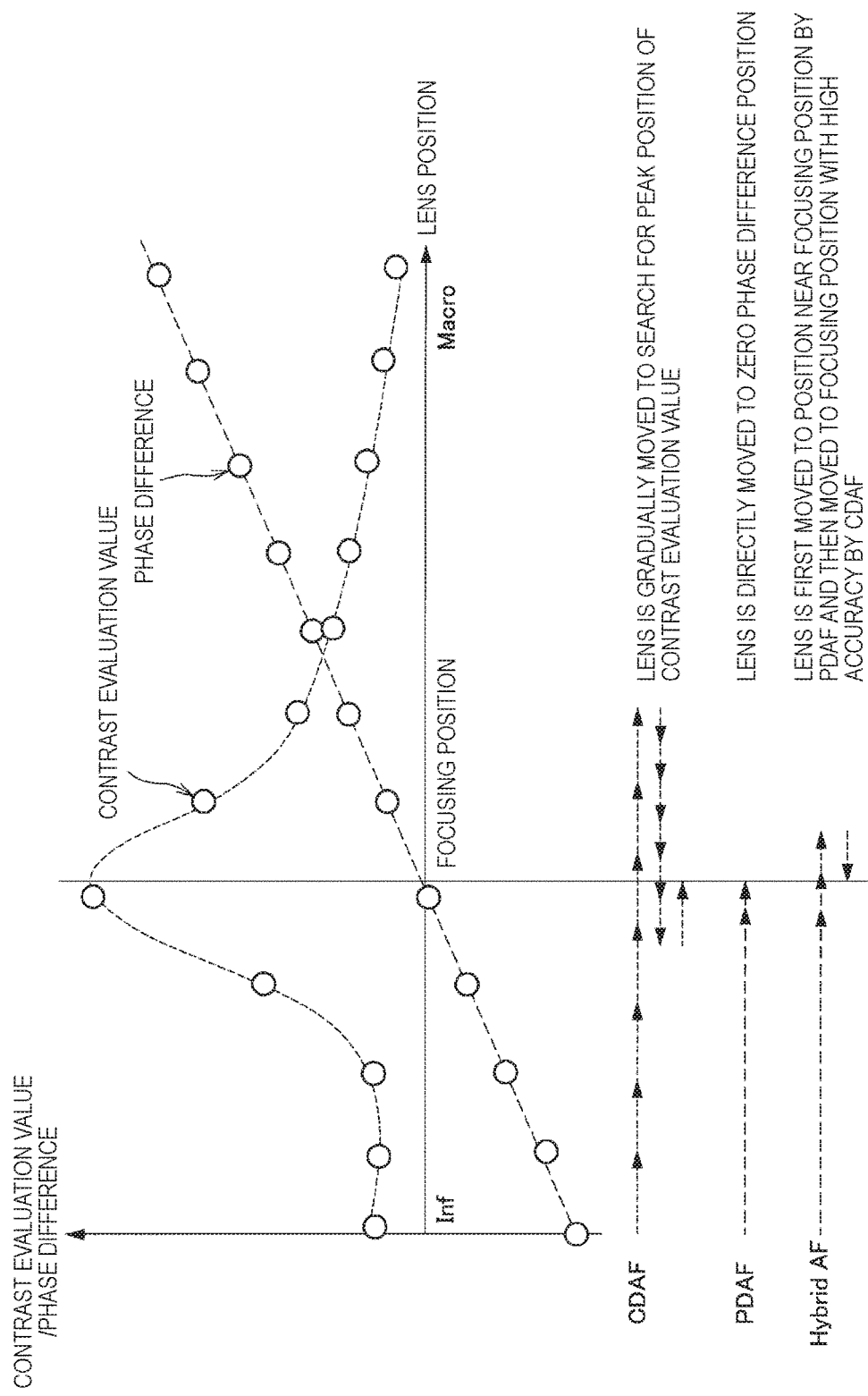

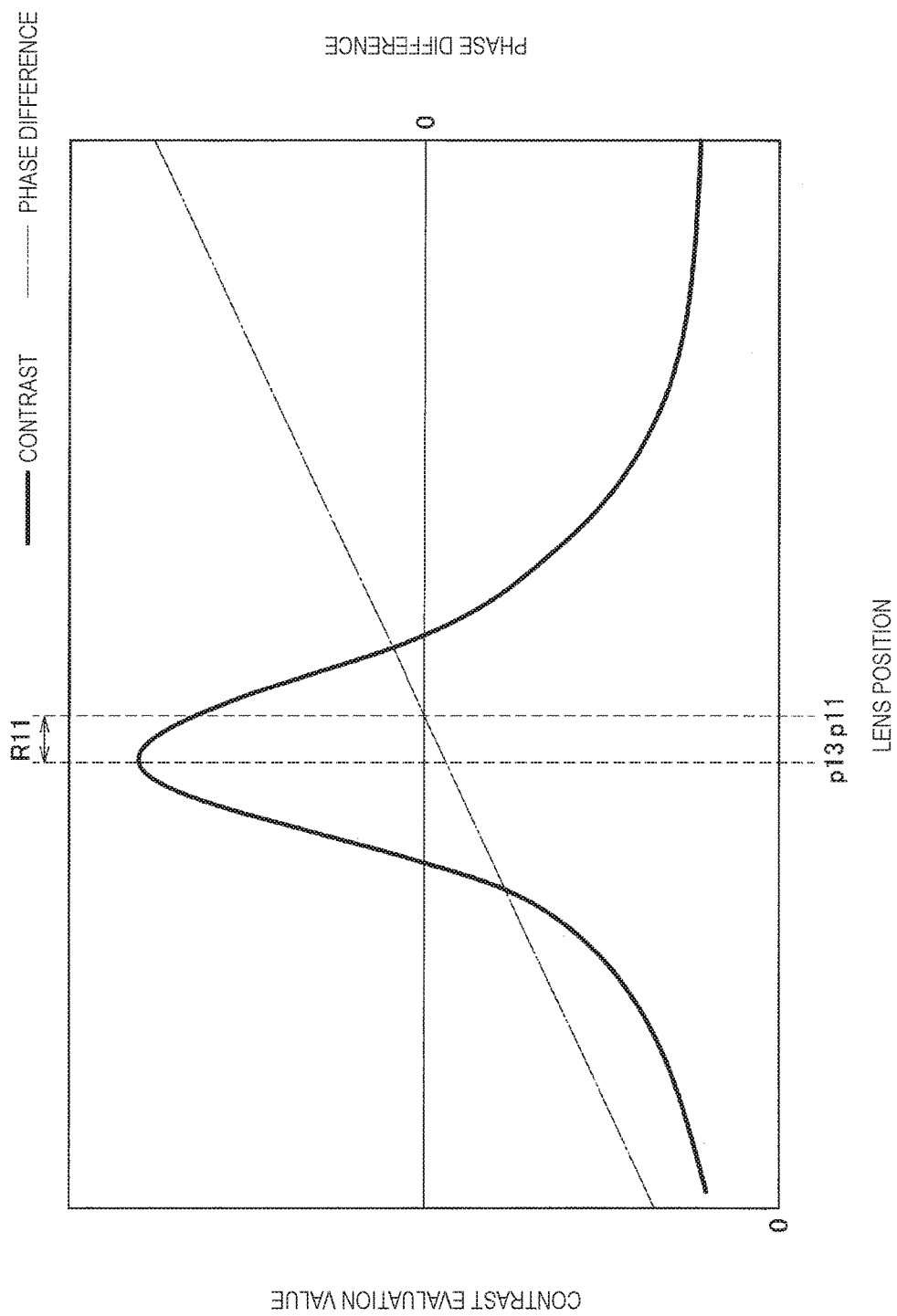

IMAGE CAPTURING DEVICE, IMAGE CAPTURING METHOD, CAPABLE OF IMPROVING TRACKABILITY OF FOCUS POSITION AND FOCUSING ACCURACY WITH RESPECT TO SUBJECT

CROSS REFERENCE TO RELATED APPLICATIONS

This application is a U.S. National Phase of International Patent Application No. PCT/JP2016/063109 filed on Apr. 26, 2016, which claims priority benefit of Japanese Patent Application No. JP 2015-152079 filed in the Japan Patent Office on Jul. 31, 2015. Each of the above-referenced applications is hereby incorporated herein by reference in its entirety.

TECHNICAL FIELD

The present disclosure relates to an image capturing device, an image capturing method, and a program.

BACKGROUND ART

For example, as an autofocus (hereinafter, abbreviated as "AF") method of an image capturing device such as a digital (video/still) camera, a phase detection AF (hereinafter, also referred to as "PDAF") method, a contrast detection AF (hereinafter, also referred to as "CDAF") method, and a hybrid AF method in which PDAF and CDAF are combined are known.

In the phase detection AF method, AF is performed by using a phase difference between two images obtained by splitting an exit pupil of an imaging optical system.

As the phase detection AF method, there is a method in which an external phase detection sensor is provided in addition to an image sensor serving as an imaging element for taking an image and a phase difference is obtained on the basis of output of the phase detection sensor. Further, as the phase detection AF method, there is an focal plane phase detection AF method in which detection pixels for detecting a phase difference, which receive light passed through different regions of an exit pupil of an imaging optical system, are arranged as a part of pixels included in an imaging element and a phase difference is obtained on the basis of pixel values of the detection pixels.

In the phase detection AF method, AF scanning operation for moving a focus position (lens position) of the imaging optical system does not need to be performed at the time of AF, and therefore it is possible to execute AF for a comparatively short time.

Meanwhile, in the contrast detection AF method, a contrast evaluation value for evaluating a contrast of an image taken by an image sensor is obtained while AF scanning operation is being performed. Then, a lens position of an imaging optical system at which the contrast evaluation value is the largest is detected as a focusing position, and the lens position is moved to the focusing position.

In the contrast detection AF method, detection accuracy of the focusing position is generally high, as compared to the phase detection AF method. However, it takes time to execute (complete) AF in some cases because the AF scanning operation is performed.

The phase detection AF method is excellent in terms of execution time of AF (detection time of the focusing position), and the contrast detection AF method is excellent in terms of accuracy of AF (detection accuracy of the focusing position). The hybrid AF method has both excellent points of the phase detection AF method and the contrast detection AF method.

That is, in the hybrid method, a lens position (of an imaging optical system) is first moved to a position near a focusing position by the phase detection AF method, and then the lens position is moved to the focusing position by the contrast detection AF method. With this, it is possible to move the lens position to the focusing position for a short time with high accuracy.

Further, in recent years, there has been proposed a function referred to as so-called continuous AF that continuously performs focusing on a subject without fixing a focus position. In the continuous AF, the focus position is not fixed, and therefore it is effective in performing focusing on a moving subject in particular, and the continuous AF may also be applied in a case where a moving image is captured. For example, Patent Literature 1 discloses an example of the continuous AF.

CITATION LIST

Patent Literature

Patent Literature 1: JP 5400396B

DISCLOSURE OF INVENTION

Technical Problem

Note that, at the time of capturing a moving image or at the time of continuously taking images (so-called continuous shooting), only the phase detection AF method capable of executing AF for a comparatively short time is applied in some cases in order to cause a focus position to track a subject in a more suitable mode (i.e., in order to improve trackability).

Meanwhile, in a case where only the phase detection AF method is applied at the time of, for example, capturing a moving image or continuously taking images, focusing accuracy is reduced in some cases, as compared to a case where the contrast detection AF method or the hybrid AF method is applied.

In view of this, the present disclosure proposes an image capturing device, an image capturing method, and a program capable of improving both trackability of a focus position and focusing accuracy with respect to a subject.

Solution to Problem

According to the present disclosure, there is provided an image capturing device including: an imaging element having a light receiving surface including detection pixels that receive light passed through different regions of an exit pupil of an imaging optical system, and detect a phase difference between two images obtained by splitting the exit pupil; a first detection unit configured to execute at least any of first focus detection based on a phase detection autofocus (AF) method and second focus detection based on a contrast detection AF method; a focusing control unit configured to drive at least one optical member included in the imaging optical system toward a focusing position detected by the focus detection; and a second detection unit configured to detect a change in a subject image. In a case where a state in which a change amount of the subject image is less than a threshold continues for a predetermined period of time or more after the first focus detection, the first detection unit executes the first focus detection or the second focus detection.

In addition, according to the present disclosure, there is provided an image capturing method including: detecting, on the basis of a result of receiving light passed through different regions of an exit pupil of an imaging optical system, a phase difference between two images obtained by splitting the exit pupil; causing a processor to execute at least any of first focus detection based on a phase detection AF method and second focus detection based on a contrast detection AF method; driving at least one optical member included in the imaging optical system toward a focusing position detected by the focus detection; and detecting a change in a subject image. In a case where a state in which a change amount of the subject image is less than a threshold continues for a predetermined period of time or more after the first focus detection, the first focus detection or the second focus detection is executed.

In addition, according to the present disclosure, there is provided a program for causing a computer to execute detecting, on the basis of a result of receiving light passed through different regions of an exit pupil of an imaging optical system, a phase difference between two images obtained by splitting the exit pupil, causing a processor to execute at least any of first focus detection based on a phase detection AF method and second focus detection based on a contrast detection AF method, driving at least one optical member included in the imaging optical system toward a focusing position detected by the focus detection, and detecting a change in a subject image. In a case where a state in which a change amount of the subject image is less than a threshold continues for a predetermined period of time or more after the first focus detection, the first focus detection or the second focus detection is executed.

Advantageous Effects of Invention

As described above, the present disclosure provides an image capturing device, an image capturing method, and a program capable of improving both trackability of a focus position and focusing accuracy with respect to a subject.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2A is a plan view illustrating a configuration example of an image sensor seen from an imaging optical system side.

FIG. 2 B is a diagram for describing a basic schematic configuration of a solid-state image capturing device of the present technology.

FIGS. 4A, 4B and 4C are diagrams illustrating a configuration example of detection pixels.

FIG. 7 is a diagram for describing contrast detection AF (CDAF), phase detection AF (PDAF), and hybrid AF.

FIG. 9 is an explanatory view for describing examples of focusing positions in a phase detection AF method and a contrast detection AF method.

MODE(S) FOR CARRYING OUT THE INVENTION

Figure 1:
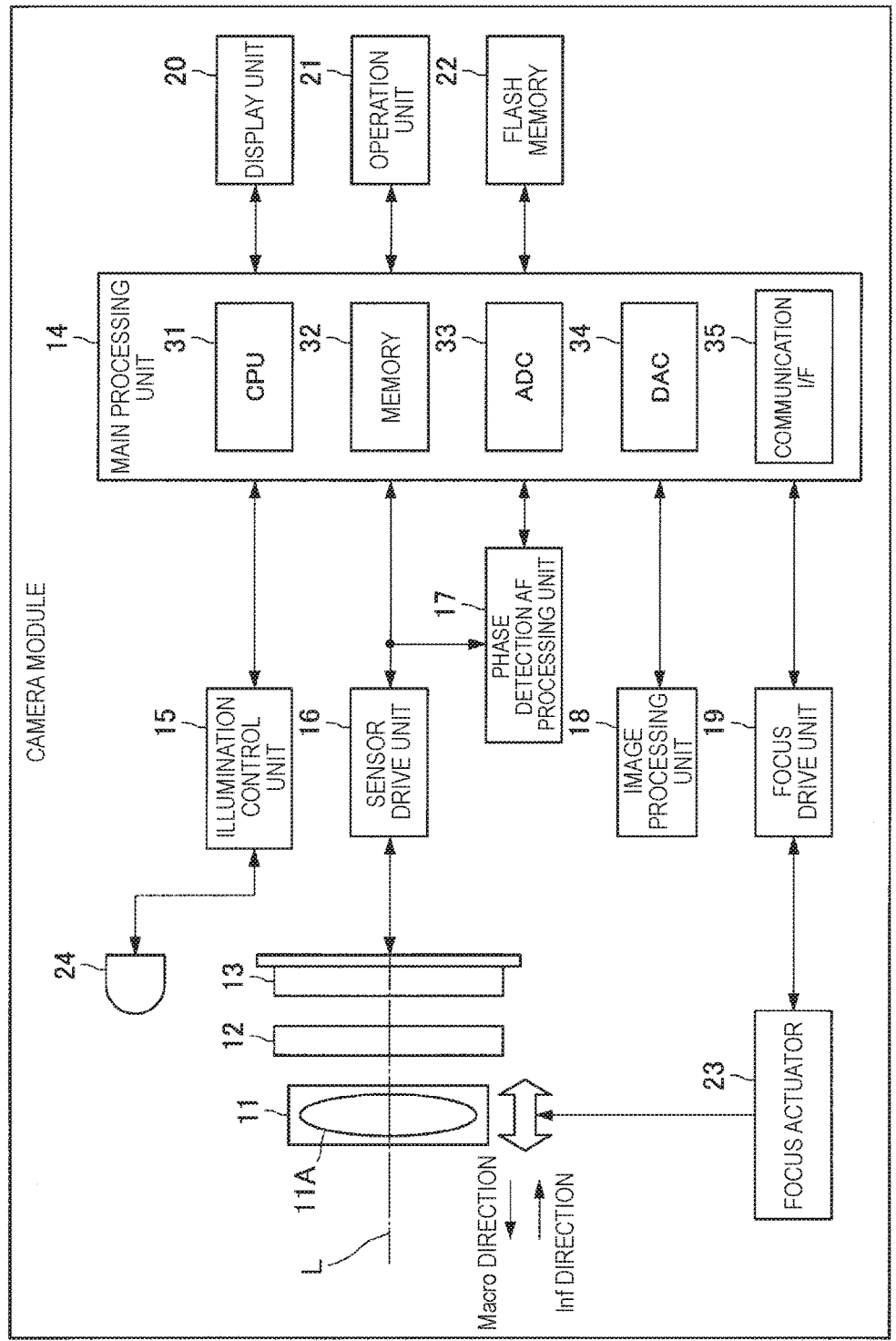
FIG. 1 is a block diagram illustrating a configuration example of an embodiment of a camera module to which the present technology is applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Embodiment of camera module to which present technology is applied
2. Configuration example of image sensor
3. Configuration example of pixels
4. Description of AF
5. Phase difference and defocus amount
6. Study of focusing accuracy
7. Technical features
8. Modification examples
   8.1. Modification example 1: Setting of scene-stabilization waiting time based on result of phase detection AF 8.2. Modification example 2: Switching of operation of contrast detection AF based on result of phase detection AF 9. Usage examples of camera module 10. Conclusion

1. Embodiment of Camera Module to which Present Technology is Applied

FIG. 1 is a block diagram illustrating a configuration example of an embodiment of a camera module to which the present technology is applied.

In FIG. 1, a camera module includes a lens barrel 11, an optical filter 12, an image sensor 13, a main processing unit 14, an illumination control unit 15, a sensor drive unit 16, a phase detection AF processing unit 17, an image processing unit 18, a focus drive unit 19, a display unit 20, an operation unit 21, a flash memory 22, a focus actuator 23, and an illumination unit 24.

Note that, in FIG. 1, the camera module is integrally configured with the lens barrel 11. However, the camera module can be configured so that the lens barrel 11 is removable.

The lens barrel 11 includes an imaging optical system 11A such as a lens group and a diaphragm and collects light incident thereon on the image sensor 13 via the optical filter 12.

Note that a lens position (in other words, a focus position) of the lens group of the imaging optical system 11A is movable in an optical axis L direction. With this, it is possible to adjust a focus.

The optical filter 12 is an optical element for reducing false color and moire generated in an image taken by the image sensor 13. That is, the optical filter 12 is an optical low-pass filter, and a part of components of light from the imaging optical system 11A is attenuated and is emitted toward the image sensor 13.

The image sensor 13 is an imaging element that takes an image by receiving light (subject light) incident from the imaging optical system 11A via the optical filter 12. It is possible to employ, for example, a complementary metal oxide semiconductor (CMOS) image sensor as the image sensor 13.

The image sensor 13 supplies (image signals of) the image taken by capturing an image to the sensor drive unit 16.

The main processing unit 14 controls each block included in the camera module.

The main processing unit 14 includes a central processing unit (CPU) 31, a memory 32, an analog to digital converter (ADC) 33, a digital to analog converter (DAC) 34, and a communication interface (I/F) 35.

The CPU 31 controls the illumination control unit 15, the flash memory 22, or the like by executing programs stored on the memory 32, thereby causing various kinds of processing to be executed such as AF, taking an image, various kinds of image processing, and recording a taken image.

The memory 32 includes a volatile memory such as a random access memory (RAM), a nonvolatile memory such as an electrically erasable programmable read only memory (EEPROM), or the like and stores the programs to be executed by the CPU 31 and data necessary to operate the CPU 31.

The data stored on the memory 32 is, for example, an AF parameter for phase detection AF described below.

The ADC 33 performs AD conversion from an analog signal into a digital signal. The DAC 34 performs DA conversion from a digital signal into an analog signal. The communication I/F 35 controls communication with the Internet or the like.

The illumination control unit 15 performs control so that the illumination unit 24 emits light serving as light with which a subject is illuminated and torch auxiliary light for AF.

That is, the illumination control unit 15 causes the illumination unit 24 to emit (turn on) an electronic flash serving as light with which a subject is illuminated, in synchronization with image taking operation of the image sensor 13. Further, the illumination control unit 15 causes the illumination unit 24 to emit torch auxiliary light in synchronization with AF operation.

The sensor drive unit 16 performs control so that the image sensor 13 takes an image. Further, the sensor drive unit 16 performs AD conversion of image signals of the image taken by the image sensor 13 as necessary and supplies the image signals to the main processing unit 14 and the phase detection AF processing unit 17.

The phase detection AF processing unit 17 calculates a lens moving amount for moving the lens position of (the lens group of) the imaging optical system 11A by the phase detection AF by using pixel values of detection pixels described below among the image signals of the taken image from the sensor drive unit 16 and supplies the lens moving amount to the main processing unit 14.

The image processing unit 18 performs image processing, such as γ conversion, color interpolation, and compression/expansion using a predetermined compression/expansion method such as the joint photographic experts group (JPEG), with respect to the image taken by the image sensor 13 and supplied via the sensor drive unit 16 and the main processing unit 14. Further, the image processing unit 18 calculates a contrast evaluation value indicating a contrast of the taken image and supplies the contrast evaluation value to the main processing unit 14. In the main processing unit 14, (control of) contrast detection AF is performed by using the contrast evaluation value from the image processing unit 18.

The focus drive unit 19 drives the focus actuator 23 in accordance with control by the main processing unit 14 and moves the lens position of the imaging optical system 11A in the optical axis L direction, thereby adjusting a focus.

The display unit 20 includes, for example, a liquid crystal display (LCD) panel and displays information regarding an image-taking mode of the camera module, a preview image before taking an image, an image for checking after taking an image, an image in a focused state at the time of AF, and the like.

The operation unit 21 is a switch group to be operated by a user and includes a power supply switch, a release (image-taking trigger) switch, a zoom operation switch, an image-taking mode selection switch, and the like.

The flash memory 22 is detachable from the camera module. A taken image supplied from the main processing unit 14 is recorded (stored) on the flash memory 22.

The focus actuator 23 is driven by the focus drive unit 19 and moves the lens position of the imaging optical system 11A in the optical axis L direction.

The illumination unit 24 emits light serving as light with which a subject is illuminated and torch auxiliary light for AF in accordance with control by the illumination control unit 15.

As the illumination unit 24, it is possible to employ, for example, a flash illumination device using a xenon tube, an LED illumination device including a light emitting diode (LED) capable of continuously emitting light, or the like. In a case where the camera module is mounted on a portable device such as a smartphone, it is possible to employ a comparatively small LED illumination device as the illumination unit 24.

The illumination unit 24 emits light toward a field via a light emitter lens (not illustrated) in which a groove of a predetermined pattern is formed, thereby improving accuracy of AF with respect to a dark subject and a low-contrast subject.

Note that the phase detection AF processing unit 17 can be included (provided) in the image sensor 13.

Further, the phase detection AF processing unit 17 can be realized by hardware or can also be realized by software. In a case where the phase detection AF processing unit 17 is realized by software, for example, programs included in the software are installed in a computer such as the main processing unit 14 and are executed by the CPU 31 of the main processing unit 14.

In this case, processing that the CPU 31 performs in accordance with the programs is not necessarily performed in time series in the order shown as flowcharts described below. That is, the processing that the CPU 31 performs in accordance with the programs also includes processing executed in parallel or individually (for example, parallel processing or processing to be performed by object).

Herein, the programs can be recorded in advance on the memory 32 serving as a recording medium provided in the main processing unit 14 serving as a computer.

Alternatively, the programs can be stored (recorded) on, for example, the flash memory 22 that is a removable recording medium and be provided as so-called packaged software.

Note that the programs can be installed not only in the main processing unit 14 from the flash memory 22 but also in the memory 32 provided therein by being downloaded into the main processing unit 14 via a communication network such as the Internet or a broadcast network such as terrestrial broadcasting.

2. Configuration Example of Image Sensor

FIG. 2A is a plan view illustrating a configuration example of the image sensor 13 seen from the imaging optical system 11A side.

The image sensor 13 has a light receiving surface 50 that receives light, and the light receiving surface 50 includes H×V number of pixels (H represents the number of pixels lined up in a horizontal row and V represents the number of pixels lined up in a vertical column).

Herein, in the present embodiment, when the light receiving surface 50 is divided into, for example, rectangular blocks each of which serves as a pixel group including a plurality of pixels, the block is also referred to as "pixel block 51".

FIG. 2A illustrates 9×9 pixels as a part of pixel groups included in the pixel block 51.

For example, (primary color) color filters of red (R), green (G), and blue (B) in a Bayer array are provided on the pixels in an on-chip manner.

Herein, the pixels on which the color filters of R, G, and B are provided are referred to as an R pixel, a G pixel, and a B pixel, respectively. The R pixel, the G pixel, and the B pixel have spectral sensitivities of R, G, and B light, respectively, because of the on-chip color filters. In the Bayer array, 2×2 pixels (2×2 means horizontal row×vertical column) are considered to be a basic unit, and G pixels are arranged in diagonal positions and an R pixel and a B pixel are arranged in the remaining two positions.

In FIG. 2A, in 2×2 pixels considered to be a basic unit, for example, the R pixel is arranged in an upper right position, the B pixel is arranged in a lower left position, and the G pixels are arranged in an upper left position and a lower right position.

In the Bayer array, the above basic unit is repeatedly arranged horizontally and vertically.

Note that, in FIG. 2A, the G pixel in the upper left position of the basic unit is denoted by Gr, and the G pixel in the lower right position thereof is denoted by Gb.

The light receiving surface 50 includes detection pixels 53 for detecting a phase difference to be used for the phase detection AF and normal pixels (pixels used for the purpose of obtaining an image to serve as a taken image) 52 that are other than the detection pixels 53 and are not used to detect a phase difference.

Although details of the detection pixels 53 will be described below, left half portions or right half portions of the detection pixels 53 are shielded in order to receive, for example, light passed through a right half portion or left half portion serving as different regions of an exit pupil of the imaging optical system 11A.

Note that, regarding a taken image, a main component of luminance is acquired on the basis of pixel values of the G pixels.

Herein, a basic schematic configuration of a solid-state image capturing device (i.e., the image sensor 13) of the present technology will be described with reference to FIG. 2B.

As a first example, a solid-state image capturing device 330 illustrated in an upper part of FIG. 2B includes a pixel region 332, a control circuit 333, and a logic circuit 334 including the above-described signal processing circuit on a single semiconductor chip 331.

As a second example, a solid-state image capturing device 340 illustrated in a middle part of FIG. 2B includes a first semiconductor chip unit 341 and a second semiconductor chip unit 342. A pixel region 343 and a control circuit 344 are mounted on the first semiconductor chip unit 341, and a logic circuit 345 including the above-described signal processing circuit is mounted on the second semiconductor chip unit 342. Then, the solid-state image capturing device 340 serving as a single semiconductor chip is configured by electrically connecting the first semiconductor chip unit 341 and the second semiconductor chip unit 342 with each other.

As a third example, a solid-state image capturing device 350 illustrated in a lower part of FIG. 2B includes a first semiconductor chip unit 351 and a second semiconductor chip unit 352. A pixel region 353 is mounted on the first semiconductor chip unit 351, and a control circuit 354 and a logic circuit 355 including the above-described signal processing circuit are mounted on the second semiconductor chip unit 352. Then, the solid-state image capturing device 350 serving as a single semiconductor chip is configured by electrically connecting the first semiconductor chip unit 351 and the second semiconductor chip unit 352 with each other.

3. Configuration Example of Pixels

Figure 3A:
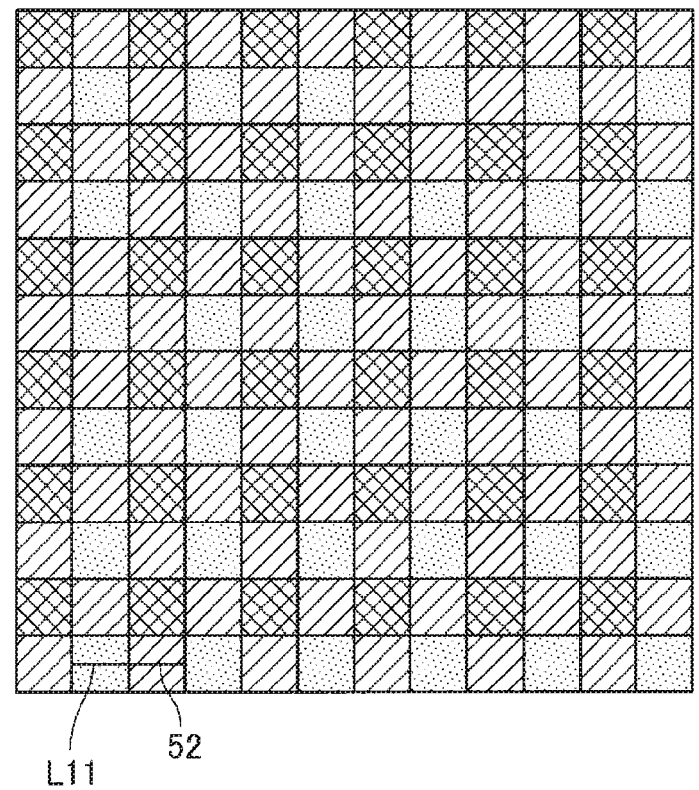
FIGS. 3A and 3B are diagrams illustrating a configuration example of normal pixels.
Figure 3B:
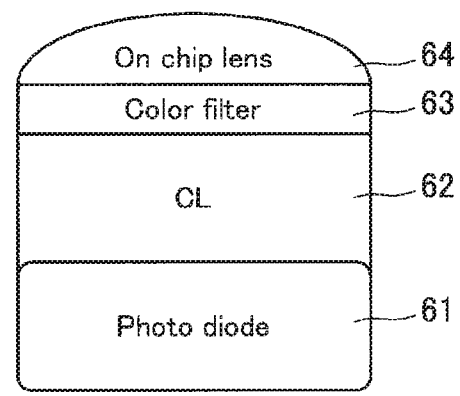

FIGS. 3A and 3B are diagrams illustrating a configuration example of the normal pixels 52.

FIG. 3A is a plan view illustrating a configuration example of a region only including the normal pixels 52 in the light receiving surface 50.

FIG. 3B is a cross-sectional view schematically illustrating a cross-section of the normal pixel 52 taken along a line segment L11 of FIG. 3A.

The normal pixel 52 is configured so that a photo diode (PD) 61, a contact layer (CL) 62, a color filter 63, and an on-chip lens (microlens) 64 are laminated from the bottom in FIGS. 3A and 3B.

In the normal pixel 52, among light incident on the on-chip lens 64, light having a predetermined color component passes through the color filter 63 and is incident on the PD 61 via the transparent CL 42. In the PD 61, light incident thereon is received and is subjected to photoelectric conversion. An electric signal obtained as a result of the photoelectric conversion in the PD 61 is output as a pixel value of the normal pixel 52.

FIGS. 4A, 4B, and 4C are diagrams illustrating a configuration example of the detection pixels 53.

FIG. 4A is a plan view illustrating a configuration example of a region including the detection pixels 53 in the light receiving surface 50.

In FIGS. 4A, 4B, and 4C, among R pixels, G pixels, and B pixels of the light receiving surface 50, some G pixels serve as the detection pixels 53. Note that, instead of the G pixels, some R pixels or some B pixels can be employed as the detection pixels.

The detection pixels 53 includes left light-shielding pixels 53L whose left half portion shields light and right light-shielding pixels 53R whose right half portion shields light in order to, for example, receive light passed through the right half portion or left half portion serving as the different regions of the exit pupil of the imaging optical system 11A.

In order to detect a phase difference between two images obtained by splitting the exit pupil of the imaging optical system 11A, the left light-shielding pixel 53L and the right light-shielding pixel 53R are paired.

B of FIG. 4 is a cross-sectional view schematically illustrating a cross-section of the left light-shielding pixel 53L among the detection pixels 53 taken along a line segment L21 of A of FIG. 4.

FIG. 4B is a cross-sectional view schematically illustrating a cross-section of the left light-shielding pixel 53L among the detection pixels 53 taken along a line segment L21 of FIG. 4A.

FIG. 4C is a cross-sectional view schematically illustrating a cross-section of the right light-shielding pixel 53R among the detection pixels 53 taken along a line segment L22 of FIG. 4A.

Note that structural elements in the detection pixel 53 in FIGS. 4A, 4B, and 4C, which are configured in the same way as the normal pixel 52 in FIGS. 3A and 3B, are denoted by the reference signs same as the structural elements in the normal pixel 52, and, hereinafter, description thereof will be omitted as appropriate.

The detection pixel 53 is similar to the normal pixel 52 in that the PD 61 to the on-chip lens 64 are included. However, the detection pixel 53 is different from the detection pixel 53 in that a light-shielding film 66 is provided in the CL 62.

In the left light-shielding pixel 53L among the detection pixels 53, as illustrated in FIG. 4B, the light-shielding film 66 is provided to shield light incident on the left half portion of the left light-shielding pixel 53L. With this, in the left light-shielding pixel 53L, only the right half portion from the center of the on-chip lens 64, which is seen from the on-chip lens 64 side, is opened. As a result, for example, light passed through the right half portion of the exit pupil of the imaging optical system 11A is received by the left light-shielding pixel 53L.

In the right light-shielding pixel 53R among the detection pixels 53, as illustrated in FIG. 4C, the light-shielding film 66 is provided to shield light incident on the right half portion of the right light-shielding pixel 53R. With this, in the right light-shielding pixel 53R, only the left half portion from the center of the on-chip lens 64, which is seen from the on-chip lens 64 side, is opened. As a result, for example, light passed through the left half portion of the exit pupil of the imaging optical system 11A is received by the right light-shielding pixel 53R.

Pupil split of the exit pupil of the imaging optical system 11A in a horizontal direction (lateral direction) is performed by the above described pair of the left light-shielding pixel 53L and the right light-shielding pixel 53R.

Note that the detection pixels 53 are regularly arranged over the whole light receiving surface 50 in, for example, the horizontal direction. If the number of detection pixels 53 is increased, a phase difference, more specifically, accuracy of the phase detection AF, is improved. However, an image quality of a taken image is deteriorated. Therefore, it is possible to determine the number of detection pixels 53 and arrangement positions thereof in consideration of a trade-off between accuracy of the phase detection AF and an image quality of a taken image.

Further, an arrangement pattern of the detection pixels 53 can be fixed or can be different depending on, for example, a position such as a center portion or a peripheral portion of the light receiving surface 50.

Figure 5:
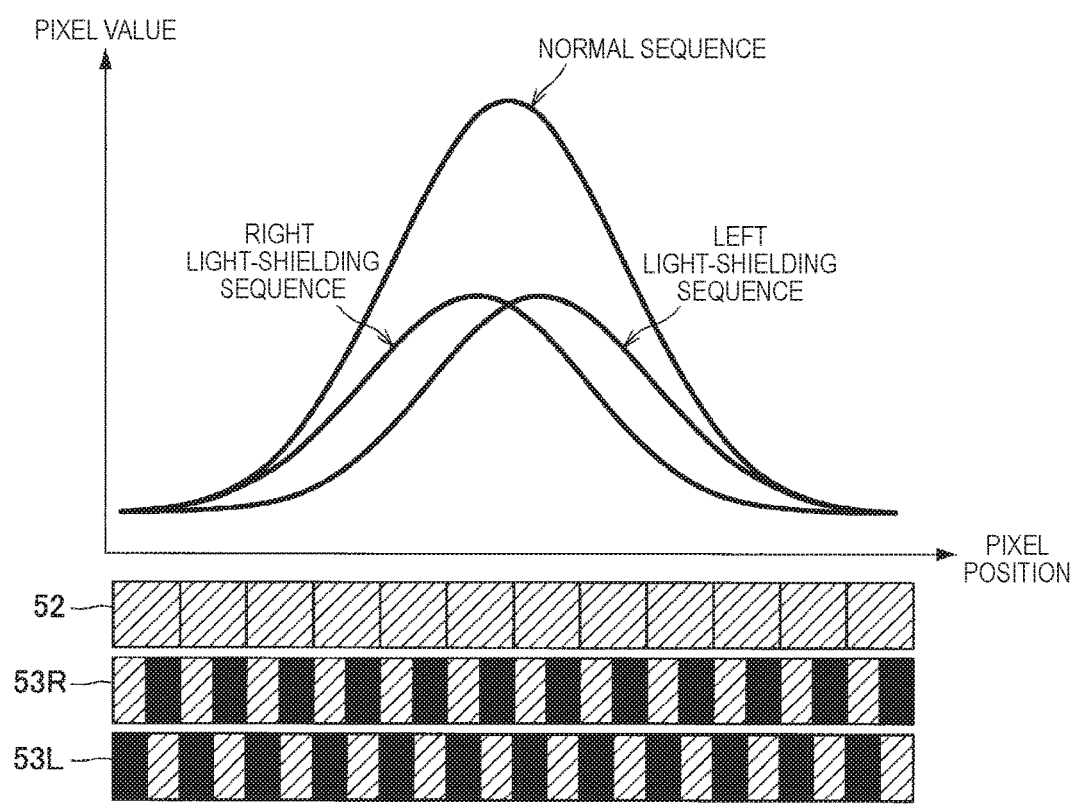
FIG. 5 is a diagram illustrating examples of sequences of pixel values of normal pixels, left light-shielding pixels, and right light-shielding pixels.

FIG. 5 is a diagram illustrating examples of sequences of pixel values of the normal pixels 52, the left light-shielding pixels 53L, and the right light-shielding pixels 53R.

Herein, a sequence of pixel values of the normal pixels 52 arranged in a line (horizontal line) is also referred to as "normal sequence". Further, a sequence of pixel values of the left light-shielding pixels 53L arranged in a line is also referred to as "left light-shielding sequence", and a sequence of pixel values of the right light-shielding pixels 53R in a line is also referred to as "right light-shielding sequence".

FIG. 5 illustrates a normal sequence and a right light-shielding sequence obtained from a line in which the normal pixels 52 and the right light-shielding pixels 53R coexist, and a left light-shielding sequence obtained from a line in which the left light-shielding pixels 53L paired with the right light-shielding pixels 53R exist.

In FIG. 5, a horizontal axis shows a position of a pixel and a vertical axis shows a pixel value (brightness).

A subject image appearing as the normal sequence is separated by the detection pixels 53 (left light-shielding pixels 53L and right light-shielding pixels 53R) into an image appearing as the left light-shielding sequence (hereinafter, also referred to as "left light-shielding image") and an image appearing as the right light-shielding sequence (hereinafter, also referred to as "right light-shielding image").

When detecting a phase difference showing a relative positional relationship between left light-shielding image and right light-shielding image by, for example, performing correlation operation of the left light-shielding image and the right light-shielding image, it is possible to detect, on the basis of the phase difference, a defocus amount that is a shift amount of a focus of the subject image.

Figure 6:
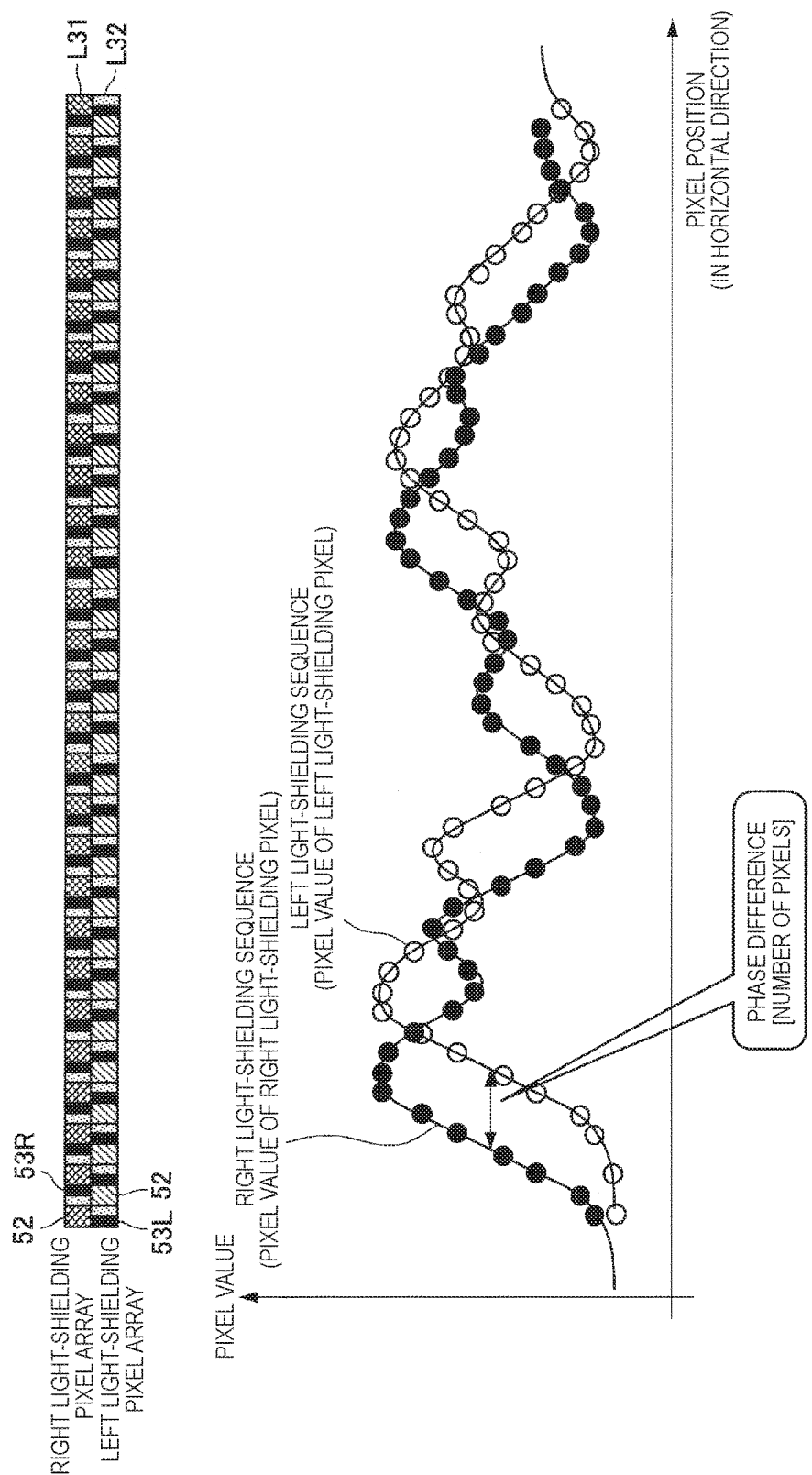
FIG. 6 is a diagram illustrating examples of a right light-shielding sequence obtained from a line in which right light-shielding pixels exist and a left light-shielding sequence obtained from a line in which left light-shielding pixels paired with the right light-shielding pixels exist.

FIG. 6 is a diagram illustrating examples of the right light-shielding sequence obtained from the line in which the right light-shielding pixels 53R exist and the left light-shielding sequence obtained from the line in which the left light-shielding pixels 53L paired with the right light-shielding pixels 53R exist.

In FIG. 6, a horizontal axis shows a position of a pixel and a vertical axis shows a pixel value.

In FIG. 6, some G pixels in a line L31 in which R pixels that are the normal pixels 52 exist serve as the right light-shielding pixels 53R. Further, in FIG. 6, some G pixels in a line L32 immediately after the line L31 serve as the left light-shielding pixels 53L. In addition, for example, the right light-shielding pixels 53R and the left light-shielding pixels 53L that are in lower-left oblique portions from the right light-shielding pixels 53R are paired to detect a phase difference (between a left light-shielding image and a right light-shielding image).

By using the left light-shielding sequence and the right light-shielding sequence, the phase difference can be obtained (detected) in the unit of the number of pixels.

A defocus amount obtained when a subject image is in a focused state is 0, and therefore it is possible to perform AF by moving the lens position of the imaging optical system 11A so that a defocus amount detected on the basis of the phase difference is 0.

4. Description of AF

FIG. 7 is a diagram for describing the contrast detection AF (CDAF), the phase detection AF (PDAF), and hybrid AF.

In FIG. 7, a horizontal axis shows the lens position of the imaging optical system 11A and a vertical axis shows a contrast evaluation value and a phase difference.

Further, in FIG. 7, a left direction of the horizontal axis shows an infinity (Inf) direction and a right direction shows a macro direction.

Herein, the Inf direction is a direction in which a subject at a far position is in focus, and the macro direction is a direction in which a subject at a close position is in focus.

In the contrast detection AF (CDAF), the contrast evaluation value indicating a contrast of an image to be taken is obtained at each lens position while moving the lens position. The lens position is moved so that the contrast evaluation value is increased.

The contrast evaluation value becomes the largest at a focusing position, and therefore, in the contrast detection AF, the lens position is moved to be close to the focusing position and passes the focusing position once. Thereafter, the lens position is slightly moved to pass the focusing position again, and, by using contrast evaluation values obtained at that time, a lens position at which the largest contrast evaluation value is obtained, i.e., the focusing position is detected. Then, the lens position is moved to the focusing position that is a position at which the largest contrast evaluation value is obtained.

In the phase detection AF (PDAF), it is assumed that the phase difference is 0 when the lens position is the focusing position, the lens position is, so to speak, directly moved so that the phase difference becomes 0.

In the hybrid AF, the lens position is first moved to a position near the focusing position by the phase detection AF, and thereafter the lens position is moved to the focusing position with high accuracy by the contrast detection AF.

5. Phase Difference and Defocus Amount

Figures 8A, 8B:
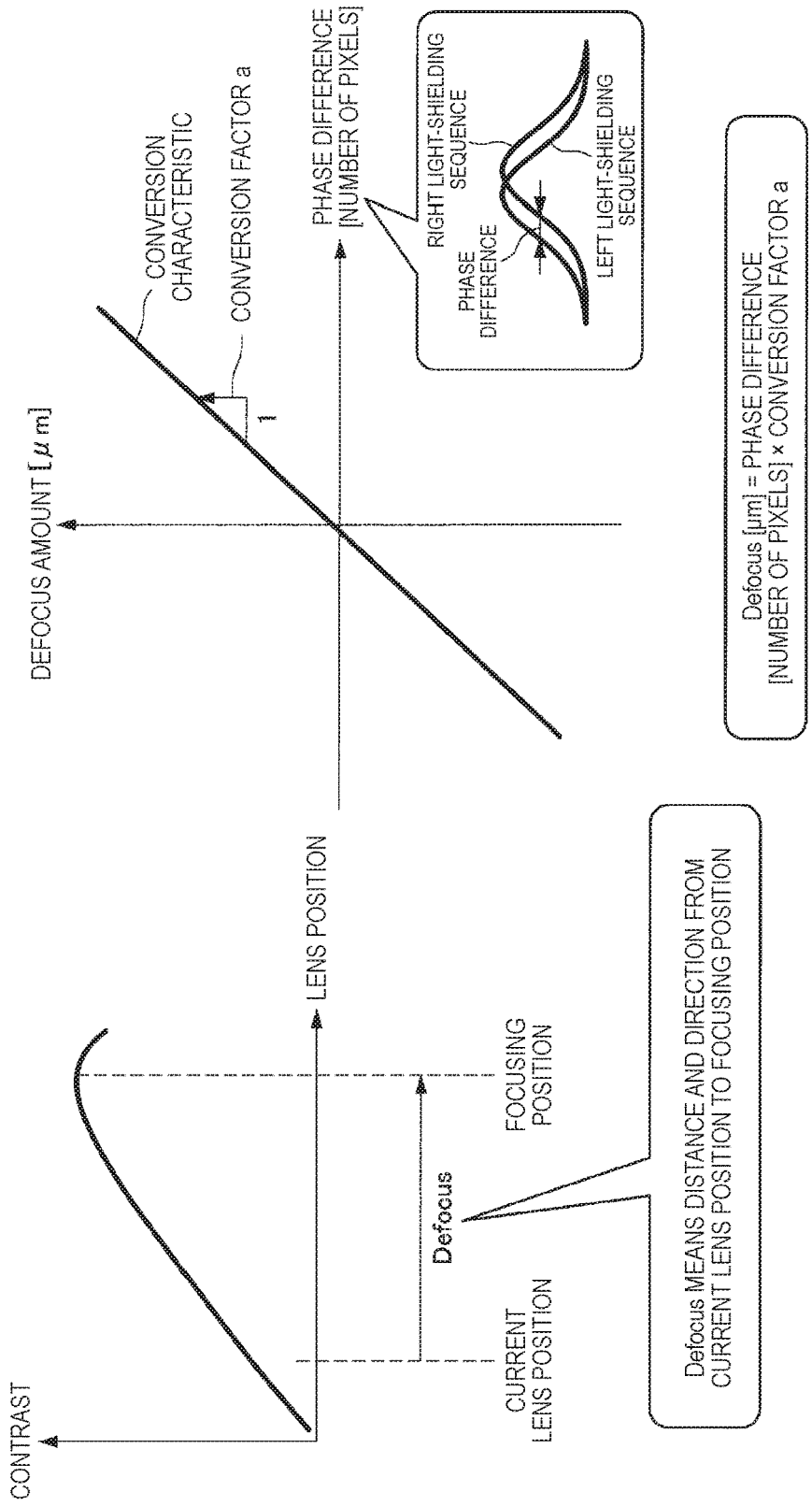
FIGS. 8A and 8B are diagrams for describing a relationship between phase difference and defocus amount.

FIGS. 8A and 8B are diagrams for describing a relationship between phase difference and defocus amount.

Both the phase difference and the defocus amount indicate a shift amount of a focus of a subject image. However, in AF, the defocus amount is used as a physical amount showing how far it is from a current lens position to the focusing position.

That is, in AF, the defocus amount shows a distance and direction from the current lens position to the focusing position.

FIG. 8A is a diagram for describing the defocus amount.

When a lens position at which the largest contrast evaluation value is obtained is used as the focusing position, the defocus amount shows a distance and direction from the current lens position to the focusing position.

Herein, when a moving amount of the lens position is shown by the um (micrometer), it is possible to employ um as a unit of the defocus amount.

Meanwhile, the phase difference shows a shift amount of a focus of a subject image as a relative positional relationship between left light-shielding image and right light-shielding image, and a unit thereof is the number of pixels.

FIG. 8B is a diagram illustrating a relationship between phase difference and defocus amount.

FIG. 8B, a horizontal axis shows a phase difference and a vertical axis shows a defocus amount.

The phase difference and the defocus amount ideally have a linear relationship as illustrated in FIG. 8B, and therefore it is possible to obtain one of the phase difference and the defocus amount on the basis of the other one of the phase difference and the defocus amount.

Herein, when a coefficient for changing (converting) a phase difference into a defocus amount is used as a conversion factor a, it is possible to obtain a defocus amount by using a phase difference in accordance with Expression (1).

Defocus amount [um]=Phase difference[number of pixels]×Conversion factor a [um/number of pixels]     (1)

When the relationship between phase difference and defocus amount is used as a conversion characteristic, the conversion characteristic is ideally indicated by a straight line. As illustrated in FIG. 8B, in a two-dimensional plane in which a horizontal axis shows a phase difference and a vertical axis shows a defocus amount, the conversion factor a indicates slope of the conversion characteristic indicated by the straight line.

The conversion factor a can be acquired in advance (before shipment) by implementing a test and the like of the camera module in a factory that manufactures the camera module.

6. Study of Focusing Accuracy

As described above, in the phase detection AF method, it is unnecessary to perform AF scanning operation that moves a focus position (lens position) of the imaging optical system at the time of AF, and therefore it is possible to execute AF for a comparatively short time. Thus, in capturing of a moving image and continuously taking images (so-called continuous shooting), sometimes focusing is performed only by the phase detection AF in order to, for example, improve trackability of a focus position with respect to a subject.

Meanwhile, in a case where focusing is performed only by the phase detection AF in capturing of a moving image and continuously taking images, focusing accuracy is reduced in some cases, as compared to a case where focusing is performed on the basis of the contrast detection AF method or the hybrid AF method.

For example, FIG. 9 is an explanatory view for describing an example of focusing positions in the phase detection AF method and the contrast detection AF method and shows an example of a relationship between phase difference and lens position and a relationship between contrast evaluation value and lens position. In FIG. 9, in a graph showing the relationship between contrast evaluation value and lens position, a horizontal axis shows the lens position and a vertical axis shows the contrast evaluation value. Further, in a graph showing the relationship between phase difference and lens position, a horizontal axis shows the lens position and a vertical axis shows the phase difference.

In FIG. 9, a reference sign PC denotes a lens position at which the phase difference is 0, i.e., shows an example of the focusing position in the phase detection AF method. Further, a reference sign p13 denotes a lens position at which the largest contrast evaluation value is obtained, i.e., shows an example of the focusing position in the contrast detection AF method.

In the example shown in FIG. 9, as indicated by a reference sign R11, there is a shift between the focusing position PC based on the phase detection AF method and the focusing position p13 based on the contrast detection AF method. As described above, generally, focusing can be performed with higher accuracy by the contrast detection AF method than by the phase detection AF method. That is, in the example shown in FIG. 9, the lens position is shifted as indicated by the reference sign R11 in a case where focusing is performed only on the basis of the phase detection AF method, as compared to a case where focusing is performed on the basis of the contrast method, and focusing accuracy is reduced by this shift.

Figure 10:
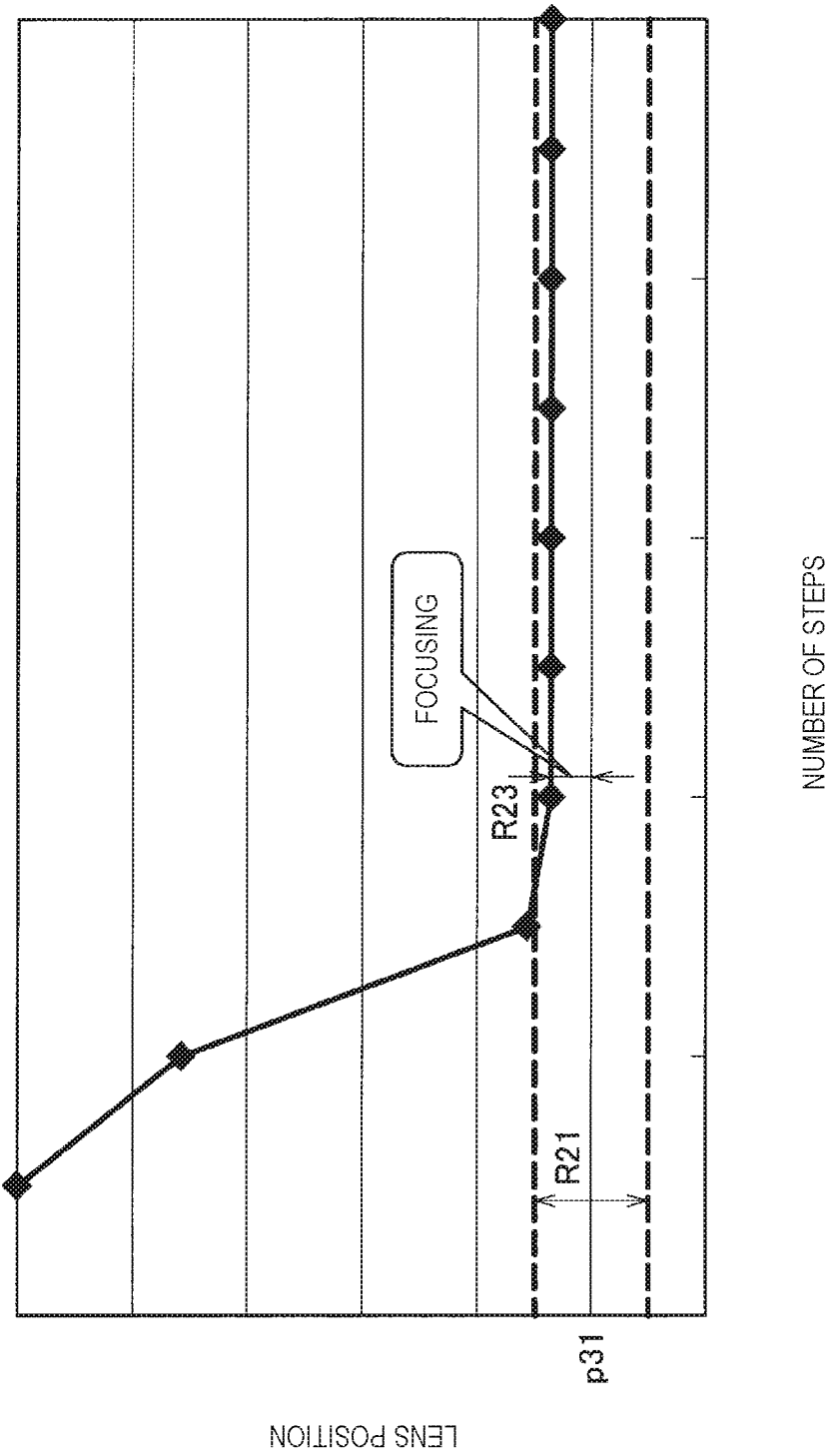
FIG. 10 is an explanatory view for describing an example of control for moving a focus position (lens position) of an imaging optical system.

Further, for example, in order to prevent occurrence of an event referred to as so-called hunting in which a focus position slightly moves forward and backward, sometimes a width of the lens position from which focusing is determined is set to be wider at the time of capturing a moving image or at the time of continuously taking images than at the time of capturing a still image. For example, FIG. 10 is an explanatory view for describing an example of control for moving the focus position (lens position) of the imaging optical system and particularly shows an example of control performed at the time of capturing a moving image or at the time of continuously taking images. In FIG. 10, a vertical axis shows the lens position and a horizontal axis shows the number of steps performed in a case where the lens position is moved at the time of AF.

In the example shown in FIG. 10, a lens position denoted by a reference sign p31 is considered to be a focusing position, and the focus position of the imaging optical system is controlled to be moved to the focusing position. Further, in the example shown in FIG. 10, as indicated by a reference sign R21, a range of the lens position (for example, a range in which a difference between the focusing position and the lens position falls within a threshold) is set by using the focusing position as a reference, and it is determined that focusing is achieved in a case where the focus position of the imaging optical system is included in the range R21, and movement of the focus position of the imaging optical system is stopped. Therefore, for example, in the example shown in FIG. 10, a shift denoted by a reference sign R23 is generated between the focus position (lens position) of the imaging optical system at which focusing is determined and the focusing position. That is, in the example shown in FIG. 10, there is a possibility that the focus position of the imaging optical system obtained in a case where focusing is determined is shifted from the focusing position by a difference between the focusing position and each end portion of the range R21 (for example, by the above-described threshold) at the maximum, and there is a possibility that focusing accuracy is reduced by this shift.

In view of such a circumstance, the present disclosure proposes a structure capable of maintaining trackability of a focus position with respect to a subject at the time of capturing a moving image or at the time of continuously taking images, and further improving focusing accuracy.

7. Technical Features

Figure 11:
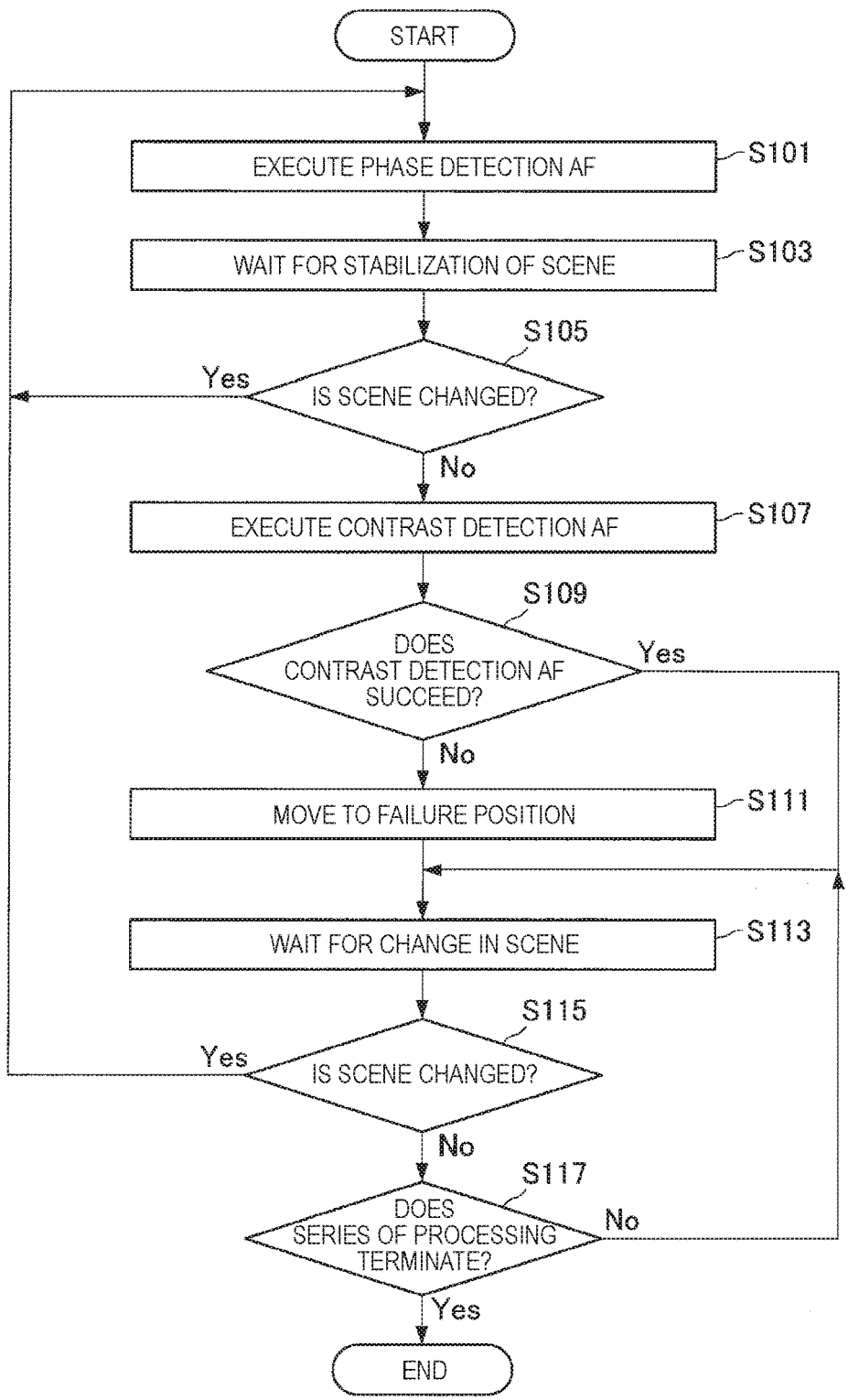
FIG. 11 is a flowchart showing an example of a flow of a series of operation regarding AF of a camera module according to an embodiment of the present disclosure.

Herein, technical features of a camera module according to an embodiment of the present disclosure will be described with reference to FIGS. 11 to 13. For example, FIG. 11 is a flowchart showing an example of a flow of a series of operation regarding AF of the camera module according to the embodiment of the present disclosure and particularly shows an example of operation regarding AF performed at the time of capturing a moving image or at the time of continuously taking images.

(Step S101)

First, the camera module controls the lens position of (the lens group of) the imaging optical system 11A on the basis of the phase detection AF method. More specifically, the phase detection AF processing unit 17 performs focus detection on the basis of the phase detection AF method and calculates a lens moving amount for moving the lens position of (the lens group of) the imaging optical system 11A on the basis of a result of the focus detection. The main processing unit 14 drives the focus actuator 23 by controlling operation of the focus drive unit 19 on the basis of the lens moving amount calculated by the phase detection AF processing unit 17 and moves the lens position of the imaging optical system 11A in the optical axis L direction, thereby adjusting a focus.

(Step S103)

When control of the lens position of the imaging optical system 11A based on the phase detection AF method is completed, the camera module waits for stabilization of a scene. As a specific example, the camera module detects a change in a subject image on the basis of at least one of wave detection values (or a combination of a plurality of wave detection values) relating to camera control, such as color information, brightness information, phase difference information, and contrast information acquired on the basis of an image capturing result of the subject image and gyro information acquired on the basis of detection results of a change in a position and direction of the camera module (for example, detection results obtained by an acceleration sensor and an angular velocity sensor). Then, in a case where a detected change amount of the subject image is less than a threshold, the camera module recognizes that the subject image is not changed (i.e., the scene is stable).

(Step S105)

In a case where a change in the scene (i.e., a change in the subject image) is detected in a predetermined period of time (for example, predetermined number of frames) (S105, YES), the camera module controls the lens position of the imaging optical system 11A again on the basis of the phase detection AF method (S101).

(Step S107)

On the contrary, in a case where a state in which a change in the scene is not detected (i.e., a state in which the scene is stable) continues for a predetermined period of time or more (for example, continues for a predetermined number of frames or more) (S105, NO), the camera module controls the lens position of the imaging optical system 11A on the basis of the contrast detection AF method. More specifically, the image processing unit 18 calculates a contrast evaluation value indicating a contrast of a taken image. In the main processing unit 14, (control of) the contrast detection AF is performed by using the contrast evaluation values calculated by the image processing unit 18.

(Step S109)

In a case where the contrast detection AF succeeds (S109, YES), the lens position of the imaging optical system 11A is controlled to be moved to a focusing position based on the contrast detection AF.

(Step S111)

On the contrary, in a case where the contrast detection AF fails (S109, NO), the camera module performs control so that the lens position of the imaging optical system 11A is moved to a position determined in advance (i.e., failure position).

(Step S113)

Then, the camera module waits for a change in the scene. Specifically, the camera module detects a change in the subject image on the basis of the above-described wave detection values relating to camera control. Then, in a case where a detected change amount of the subject image is equal to or more than the threshold, the camera module recognizes that the subject image is changed (i.e., the scene is changed).

(Step S115)

In a case where a change in the scene is detected (S115, YES), the camera module controls the lens position of the imaging optical system 11A again on the basis of the phase detection AF method (S101).

(Step S117)

On the contrary, in a case where a change in the scene is not detected (S115, NO), the camera module continues waiting for a change in the scene (S113) unless an instruction to terminate the series of processing is issued (S117, NO). Then, for example, in a case where the instruction to terminate the series of processing is issued by, for example, user operation via the operation unit 21, such as turning off a power supply, the camera module terminates the above-described series of operation regarding AF.

Hereinabove, as an example of a flow of a series of operation regarding AF of the camera module according to the embodiment of the present disclosure, an example of operation regarding AF performed at the time of capturing a moving image or at the time of continuously taking images has been particularly described with reference to FIG. 11.

Next, an example of operation regarding AF performed by the camera module according to the embodiment of the present disclosure will be described by exemplifying a specific example with reference to FIGS. 12 and 13. FIGS. 12 and 14 are explanatory views for describing an example of operation regarding AF performed by the camera module according to the embodiment of the present disclosure.

Figure 12:
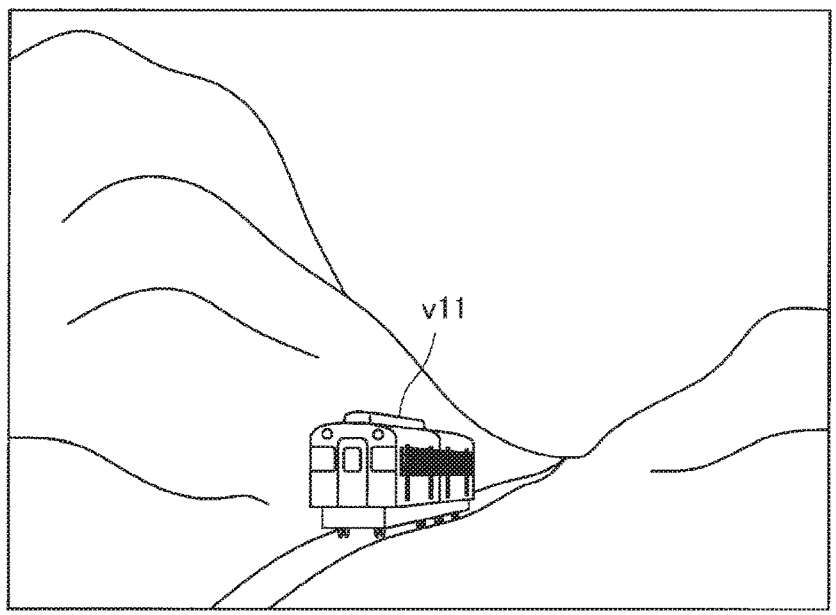
FIG. 12 is an explanatory view for describing an example of operation regarding AF performed by the camera module according to this embodiment.

For example, FIG. 12 shows an example of a state in which a moving subject (hereinafter, simply referred as "moving body" in some cases) exists in an angle of view of the camera module. In FIG. 12, a reference sign v11 denotes the moving body.

The example shown in FIG. 12 shows a state in which a scene is successively changed in accordance with movement of the moving body. In such a circumstance, the camera module according to the present embodiment controls the lens position of the imaging optical system 11A (i.e., performs focusing) on the basis of the phase detection AF method. As a more specific example, in the example shown in FIG. 12, the camera module according to the present embodiment controls the lens position of the imaging optical system 11A on the basis of the phase detection AF method so that a focus position tracks the moving body v11 moving in the angle of view.

Figure 13:
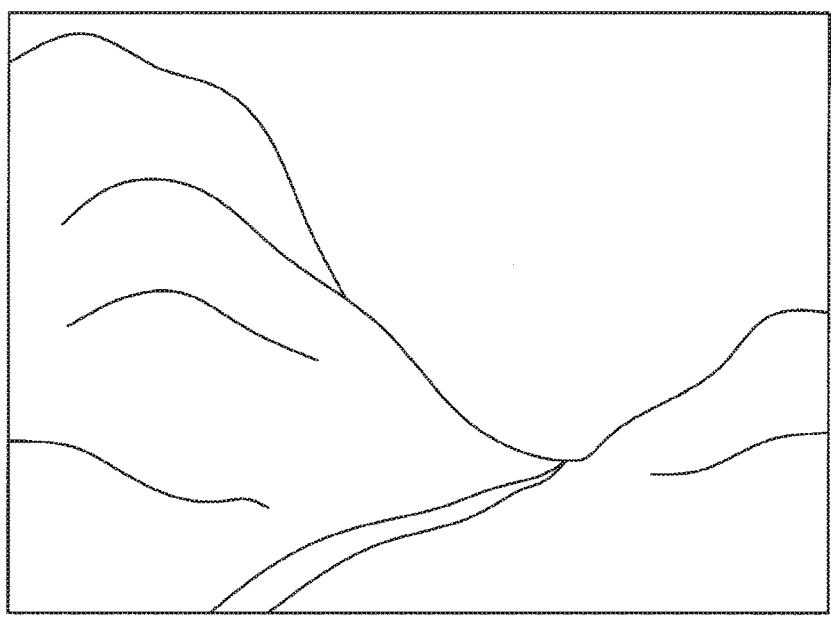
FIG. 13 is an explanatory view for describing an example of operation regarding AF performed by the camera module according to this embodiment.
Figure 14:
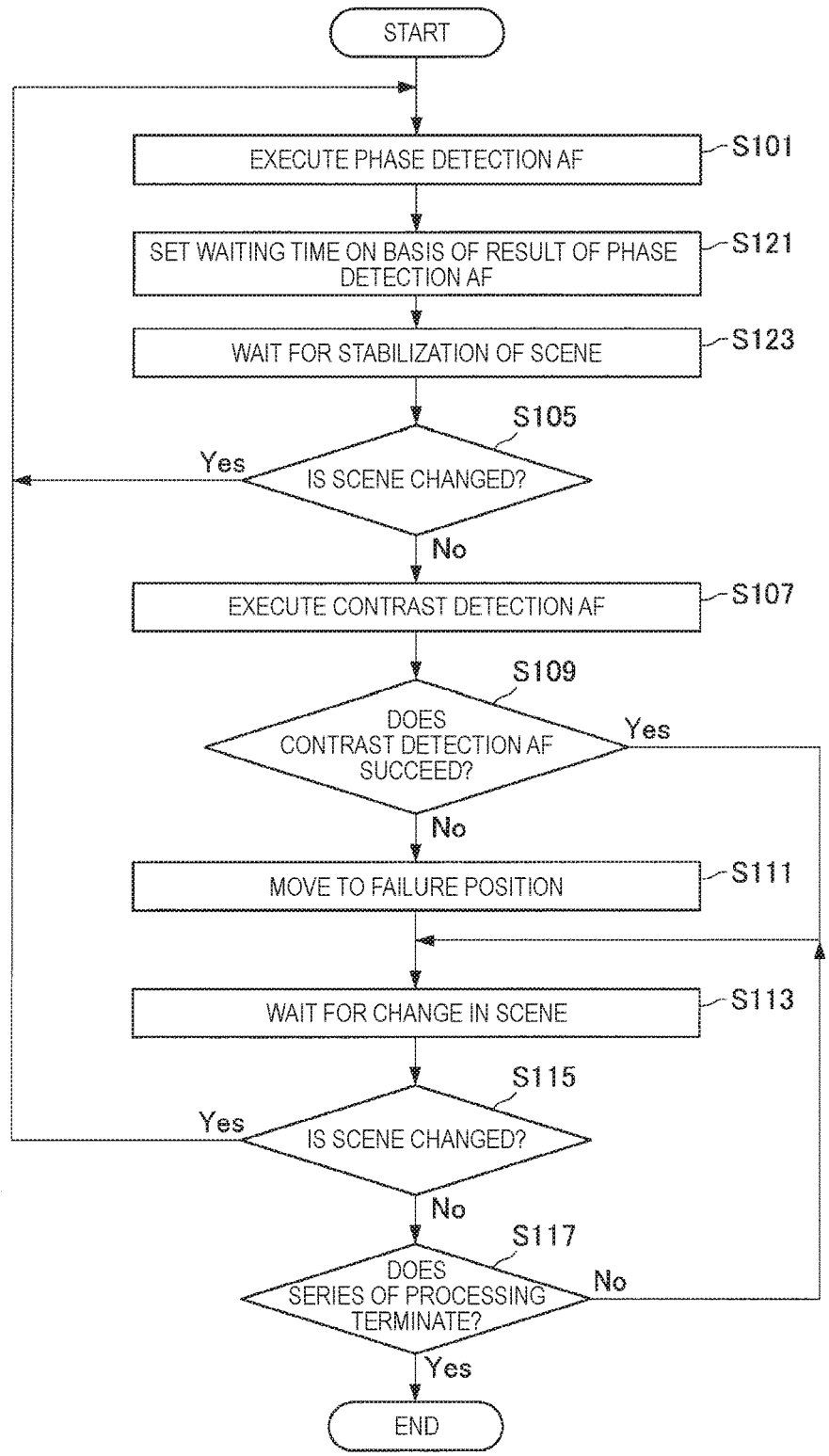
FIG. 14 is a flowchart showing an example of a flow of a series of operation regarding AF of a camera module according to a modification example 1 of this embodiment.

Then, see FIG. 13. FIG. 13 shows an example of a state in which time has elapsed from the example shown in FIG. 12 and the moving body v11 has moved to the outside of the angle of view of the camera module, i.e., the moving body does not exist in the angle of view and the scene is stable.

In a circumstance shown in FIG. 13, the camera module according to the present embodiment waits for stabilization of the scene. Then, in a case where a state in which the scene is stable (i.e., a state in which a change amount of a subject is less than a threshold) continues for a predetermined period of time or more, the camera module controls the lens position of the imaging optical system 11A (i.e., performs focusing) on the basis of the contrast detection AF method. With such control, the camera module according to the present embodiment can further improve focusing accuracy in a state in which a scene is stable.

Note that it may also be expected that the lens position of the imaging optical system 11A is controlled to be positioned closer to a focusing position (i.e., focusing accuracy is controlled to be higher) on the basis of a result of focus detection based on the phase detection AF method. Therefore, in a case where the lens position of the imaging optical system 11A is controlled to be positioned closer to the focusing position on the basis of a result of focus detection based on the phase detection AF method (for example, in a case where a difference between the lens position and the focusing position is less than a predetermined threshold), the camera module according to the present embodiment may be configured so that waiting for stabilization of a scene and controlling the lens position based on the contrast detection AF method (processing in S103 to S111) are omitted and the processing proceeds to the processing (S113) regarding waiting for a change in the scene. Note that, herein, the state in which the lens position of the imaging optical system 11A is positioned closer to the focusing position may correspond to, for example, a state in which the lens position of the imaging optical system 11A is controlled to fall within a range narrower than the range R21 in FIG. 10 (i.e., at a lens position closer to the focusing position) by using the focusing position as a reference.

Hereinabove, the technical features of the camera module according to the embodiment of the present disclosure have been described with reference to FIGS. 11 to 13. Note that, in the example described above, the camera module according to the present embodiment performs focusing on the basis of the contrast detection AF method after waiting for stabilization of a scene. However, a method thereof is not necessarily limited to control based on the contrast detection AF method as long as focusing accuracy can be further improved. As a specific example, the camera module according to the present embodiment may improve focusing accuracy by performing focusing again on the basis of the phase detection AF method after waiting for stabilization of a scene.

8. Modification Examples

Next, modification examples of the camera module according to the embodiment of the present disclosure will be described.

8.1. Modification Example 1: Setting of Scene-Stabilization Waiting Time Based on Result of Phase Detection AF First, an example of a camera module according to a modification example 1 of the present embodiment will be described. The camera module according to the modification example 1 is similar to the camera module according to the above-described embodiment (see FIG. 11) in that focus detection is performed on the basis of the phase detection AF method in a state in which a scene is changed. Meanwhile, the camera module according to the modification example 1 is different from the camera module according to the above-described embodiment in that a period of time of waiting for scene stabilization to be subsequently executed is set depending on whether or not focus detection based on the phase detection AF method succeeds.

For example, FIG. 14 is a flowchart showing an example of a flow of a series of operation regarding AF of the camera module according to the modification example 1 of the present embodiment. In the example shown in FIG. 14, processing denoted by reference signs S121 and S123 is different from the operation of the camera module according to the above-described embodiment (see FIG. 11). In view of this, in this description, operation regarding AF of the camera module according to the modification example 1 will be described by focusing on, in particular, a difference from the camera module according to the above-described embodiment.

(Step S101)

First, the camera module performs focus detection on the basis of the phase detection AF method and controls the lens position of (the lens group of) the imaging optical system 11A on the basis of a result of the focus detection. This operation is similar to the operation of the camera module according to the above-described embodiment (see FIG. 11).

(Step S121)

Then, a parameter (for example, the number of frames) regarding time of waiting for scene stabilization to be executed in Step S123 described below (the processing corresponding to Step S103 in the example shown in FIG. 11) is set on the basis of the result of the focus detection based on the phase detection AF method.

As a specific example, in a case where the focus detection based on the phase detection AF method fails, the camera module in the modification example 1 sets a corresponding parameter so that the time of waiting for scene stabilization is reduced, as compared to a case where the focus detection succeeds. Further, in a case where the focus detection based on the phase detection AF method succeeds, the camera module in the modification example 1 may set a corresponding parameter so that the time of waiting for scene stabilization is similar to, for example, the time in a case of the camera module according to the above-described embodiment (see FIG. 11) (i.e., the time of waiting for scene stabilization becomes longer than a case where the focus detection based on the phase detection AF method fails).

(Step S123)

Then, the camera module waits for stabilization of a scene on the basis of the parameter set in Step S121.

Note that operation in Step S105 and steps subsequent thereto are similar to the operation of the camera module according to the above-described embodiment (see FIG. 11). That is, in a case where a change in the scene is detected in a predetermined period of time (S105, YES), the camera module controls the lens position of the imaging optical system 11A again on the basis of the phase detection AF method (S101). Further, in a case where a state in which a change in the scene is not detected continues for a predetermined period of time or more (S105, NO), the camera module executes the processing in Step S107 and steps subsequent thereto.

With the above control, the camera module according to the modification example 1 can selectively switch, depending on whether or not the focus detection based on the phase detection AF method succeeds, behavior to be subsequently executed between behavior of waiting for stabilization of a scene and behavior of focus detection based on the contrast detection AF method. As a more specific example, in a case where, for example, the focus detection based on the phase detection AF method fails, the camera module according to the modification example 1 can immediately execute focus detection based on the contrast detection AF method without waiting for stabilization, like a case where the focus detection succeeds.

Note that the example described above is merely an example and does not necessarily limit operation of the camera module according to the modification example 1. As a specific example, it is needless to say that the camera module according to the modification example 1 may set similar parameters for the case where the focus detection based on the phase detection AF method succeeds and for the case where the focus detection based on the phase detection AF method fails, as parameters regarding the time of waiting for scene stabilization.

Hereinabove, an example of the camera module according to the modification example 1 of the present embodiment has been described with reference to FIG. 14.

8.2. Modification Example 2: Switching of Operation of Contrast Detection AF Based on Result of Phase Detection AF Next, an example of a camera module according to a modification example 2 will be described. The camera module according to the modification example 2 is different from the camera modules according to the above-described embodiment and the above-described modification example 1 in that an amount of control of the lens position of (the lens group of) the imaging optical system 11A based on the contrast detection AF method, which is executed after waiting for stabilization of a scene, is set (switched) depending on whether or not focus detection based on the phase detection AF method succeeds.

Figure 15:
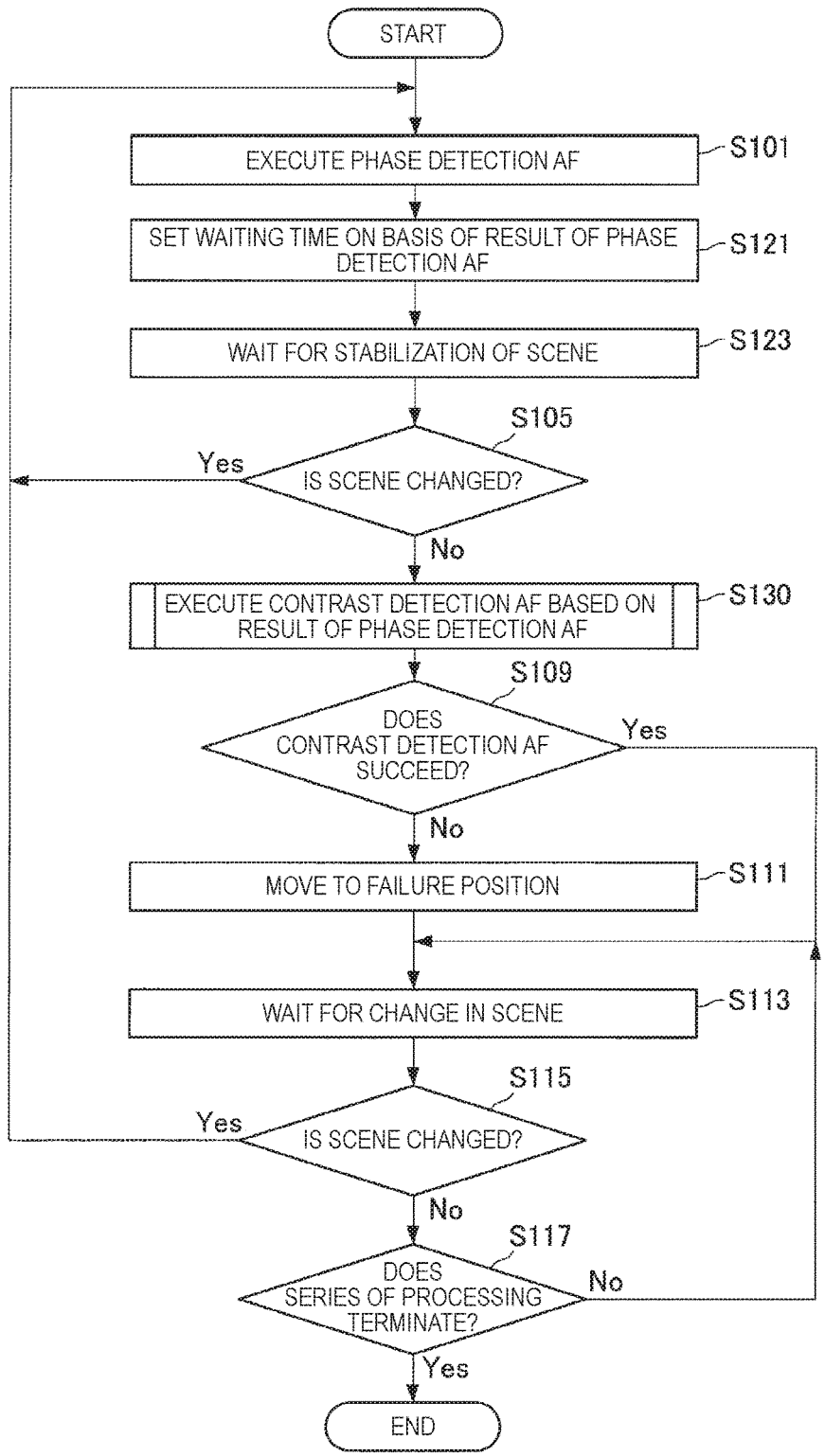
FIG. 15 is a flowchart showing an example of a flow of a series of operation regarding AF of a camera module according to a modification example 2 of this embodiment.
Figure 16:
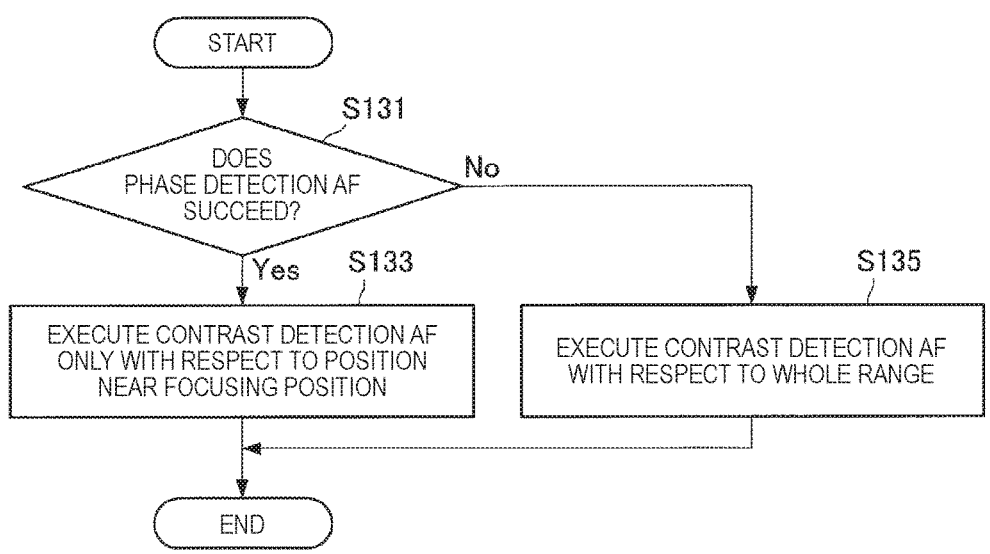
FIG. 16 is a flowchart showing an example of a flow of operation regarding AF based on a contrast detection AF method in a camera module according to the modification example 2 of this embodiment.

For example, FIG. 15 is a flowchart showing an example of a flow of a series of operation regarding AF of the camera module according to the modification example 2 of the present embodiment. In the example shown in FIG. 15, processing denoted by a reference sign S130 is different from the operation of the camera module according to the above-described modification example 1 (see FIG. 14). Further, FIG. 16 is a flowchart showing an example of a flow of operation regarding AF based on the contrast detection AF method in the camera module according to the modification example 2 of the present embodiment and shows an example of the processing denoted by the reference sign S130 in the example shown in FIG. 15. In view of this, in this description, operation regarding AF of the camera module according to the modification example 2 will be described by focusing on, in particular, a difference from the camera module according to the above-described modification example 1.

(Steps S101 to S105)

Processing in Step S101 to S105 is similar to the processing of the camera module according to the above-described modification example 1 (see FIG. 14). That is, the camera module first performs focus detection on the basis of the phase detection AF method and controls the lens position of (the lens group of) the imaging optical system 11A on the basis of a result of the focus detection (S101). Then, the camera module sets a parameter regarding time of waiting for scene stabilization on the basis of the result of the focus detection based on the phase detection AF method (S121) and waits for stabilization of a scene on the basis of the set parameter. Then, in a case where a change in the scene is detected in a predetermined period of time (S105, YES), the lens position of the imaging optical system 11A is controlled again on the basis of the phase detection AF method (S101).

(Step S130)

Further, in a case where a state in which a change in the scene is not detected continues for a predetermined period of time or more (S105, NO), the lens position of the imaging optical system 11A is controlled on the basis of the contrast detection AF method.

Herein, details of the processing denoted by Step S130 will be described with reference to FIG. 16.

(Step S133)

As illustrated in FIG. 16, the camera module according to the modification example 2 switches operation based on the contrast detection AF method depending on whether or not the focus detection based on the phase detection AF method that has been previously executed (S101 in FIG. 15) succeeds.

Specifically, in a case where the focus detection based on the phase detection AF method succeeds (S131, YES), there is a high possibility that the lens position of the imaging optical system 11A is positioned close to a focusing position. Therefore, in such a circumstance, the camera module according to the modification example 2 searches only a position near the focusing position for the focusing position on the basis of the contrast detection AF method and controls the lens position of the imaging optical system 11A. Further, at this time, the camera module configures settings so that an amount of control of the lens position of the imaging optical system 11A per step is reduced in the operation regarding AF based on the contrast detection AF method (i.e., so that a moving amount is reduced).

Figure 17:
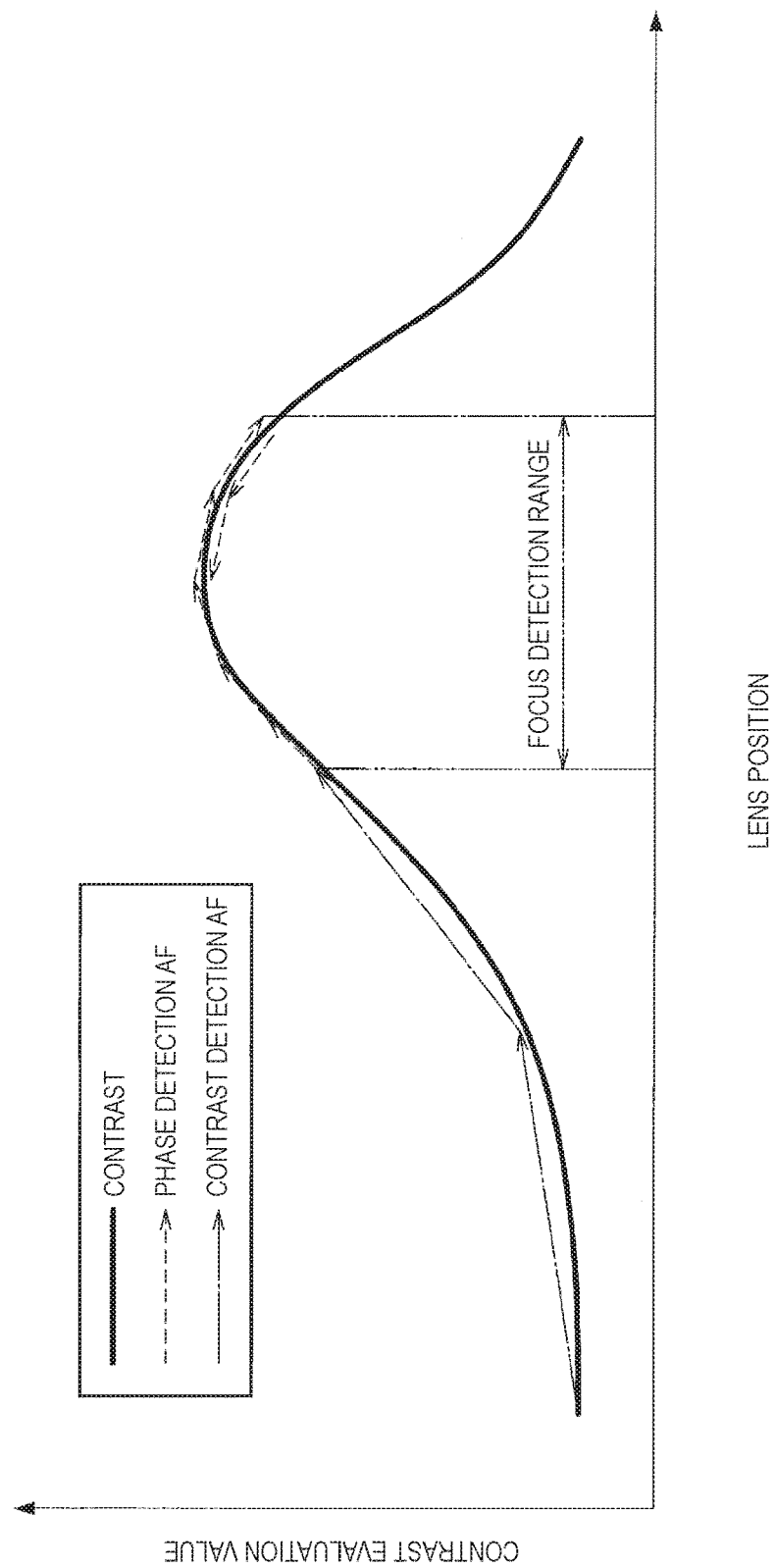
FIG. 17 is an explanatory view for describing an example of operation of the camera module according to the modification example 2 of this embodiment.

Herein, operation performed by the camera module according to the modification example 2 in a case where the focus detection based on the phase detection AF method succeeds will be described in more detail by exemplifying a specific example with reference to FIG. 17. FIG. 17 is an explanatory view for describing an example of operation of the camera module according to the modification example 2. In FIG. 17, a horizontal axis shows the lens position of the imaging optical system 11A and a vertical axis shows a contrast evaluation value.

As illustrated in FIG. 17, in a case where the focus detection based on the phase detection AF method succeeds, the lens position of the imaging optical system 11A is controlled to be moved to a position close to the focusing position (i.e., a lens position at which the largest contrast evaluation value is obtained) on the basis of a result of the focus detection. Therefore, as illustrated in FIG. 17, the camera module according to the modification example 2 minutely searches a position near the focusing position (i.e., "focus detection range" shown in FIG. 17) for a lens position at which the contrast evaluation value is the largest (i.e., focusing position) by using, as a reference position, the lens position that has been controlled on the basis of the result of the focus detection based on the phase detection AF method. With such control, in a case where the focus detection based on the phase detection AF method succeeds, the camera module according to the modification example 2 can control the lens position of the imaging optical system 11A so that focusing is achieved with higher accuracy. Further, in this case, the amount of control (i.e., moving amount) of the lens position of the imaging optical system 11A per step is set to be reduced, and therefore operation of the imaging optical system 11A based on the contrast detection AF method can be made more inconspicuous.

(Step S135)

Next, attention is focused on a case where the focus detection based on the phase detection AF method fails (S131, NO). In this case, there is a high possibility that the lens position of the imaging optical system 11A is far from the focusing position. Therefore, in such a circumstance, the camera module according to the modification example 2 searches a wider range (for example, the whole range of the contrast evaluation values) than the range used in a case where the focus detection based on the phase detection AF method succeeds, for a focusing position on the basis of the contrast detection AF method, and controls the lens position of the imaging optical system 11A. Further, at this time, the camera module configures setting so that the amount of control of the lens position of the imaging optical system 11A per step in the operation regarding AF based on the contrast detection AF method is increased (i.e., so that the moving amount is increased), as compared to a case where the focus detection based on the phase detection AF method succeeds.

Figure 18:
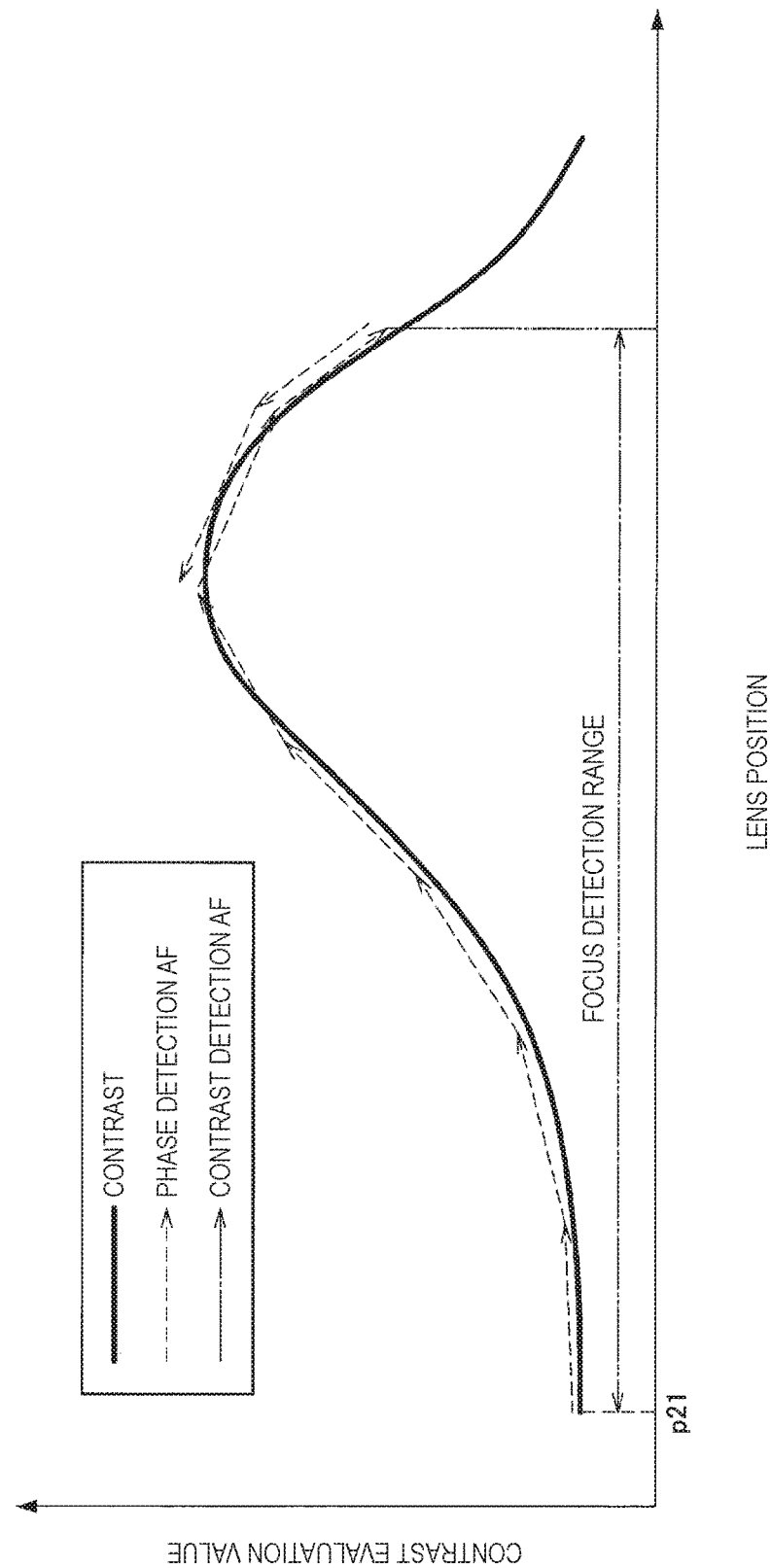
FIG. 18 is an explanatory view for describing an example of operation of the camera module according to the modification example 2 of this embodiment.

Herein, operation performed by the camera module according to the modification example 2 in a case where the focus detection based on the phase detection AF method fails will be described in more detail by exemplifying a specific example with reference to FIG. 18. FIG. 18 is an explanatory view for describing an example of operation of the camera module according to the modification example 2. In FIG. 18, a horizontal axis shows the lens position of the imaging optical system 11A and a vertical axis shows a contrast evaluation value. Further, in FIG. 18, a reference sign p21 schematically shows an example of the lens position (for example, failure position) of the imaging optical system 11A, which is obtained in a case where the focus detection based on the phase detection AF method fails.

That is, in the example shown in FIG. 18, the camera module according to the modification example 2 performs control so that, for example, the lens position of the imaging optical system 11A is moved to the failure position p21 because the focus detection based on the phase detection AF method fails. Therefore, for example, the camera module searches the whole range of the contrast evaluation values for a lens position at which the largest contrast evaluation value is obtained, as illustrated in FIG. 18. For example, in the example shown in FIG. 18, the camera module controls the lens position of the imaging optical system 11A within a range indicated as "focus detection range" (i.e., a range wider than the "focus detection range" illustrated in FIG. 17) and searches for the lens position at which the largest contrast evaluation value is obtained. Therefore, in such a case, the camera module configures setting so that the amount of control of the lens position of the imaging optical system 11A per step is increased, as compared to a case where the focus detection based on the phase detection AF method succeeds. With such control, in a case where the focus detection based on the phase detection AF method fails, the camera module according to the modification example 2 can control the lens position of the imaging optical system 11A so that focusing is achieved more quickly by contrast detection AF.

Note that processing subsequent to control of the lens position of the imaging optical system 11A based on the contrast detection AF method (i.e., processing in Step S109 and steps subsequent thereto in FIG. 15) is similar to the processing performed by the camera module according to the above-described modification example 1 (see FIG. 14).

Note that, in the example described above, an example in which, in the operation of the camera module according to the modification example 1 (see FIG. 14), operation regarding control of the lens position of the imaging optical system 11A based on the contrast detection AF method is replaced has been described as an example of the operation of the camera module according to the modification example 2. Meanwhile, the operation of the camera module according to the modification example 2 is not necessarily limited to this operation. As a specific example, in the operation of the camera module according to the above-described embodiment (see FIG. 11), the operation regarding control of the lens position of the imaging optical system 11A based on the contrast detection AF method (S105) may be replaced with the same operation of the camera module according to the modification example 2 (S130).

Hereinabove, an example of the camera module according to the modification example 2 has been described with reference to FIGS. 15 to 18.

9. Usage Examples of Camera Module

Figure 19:
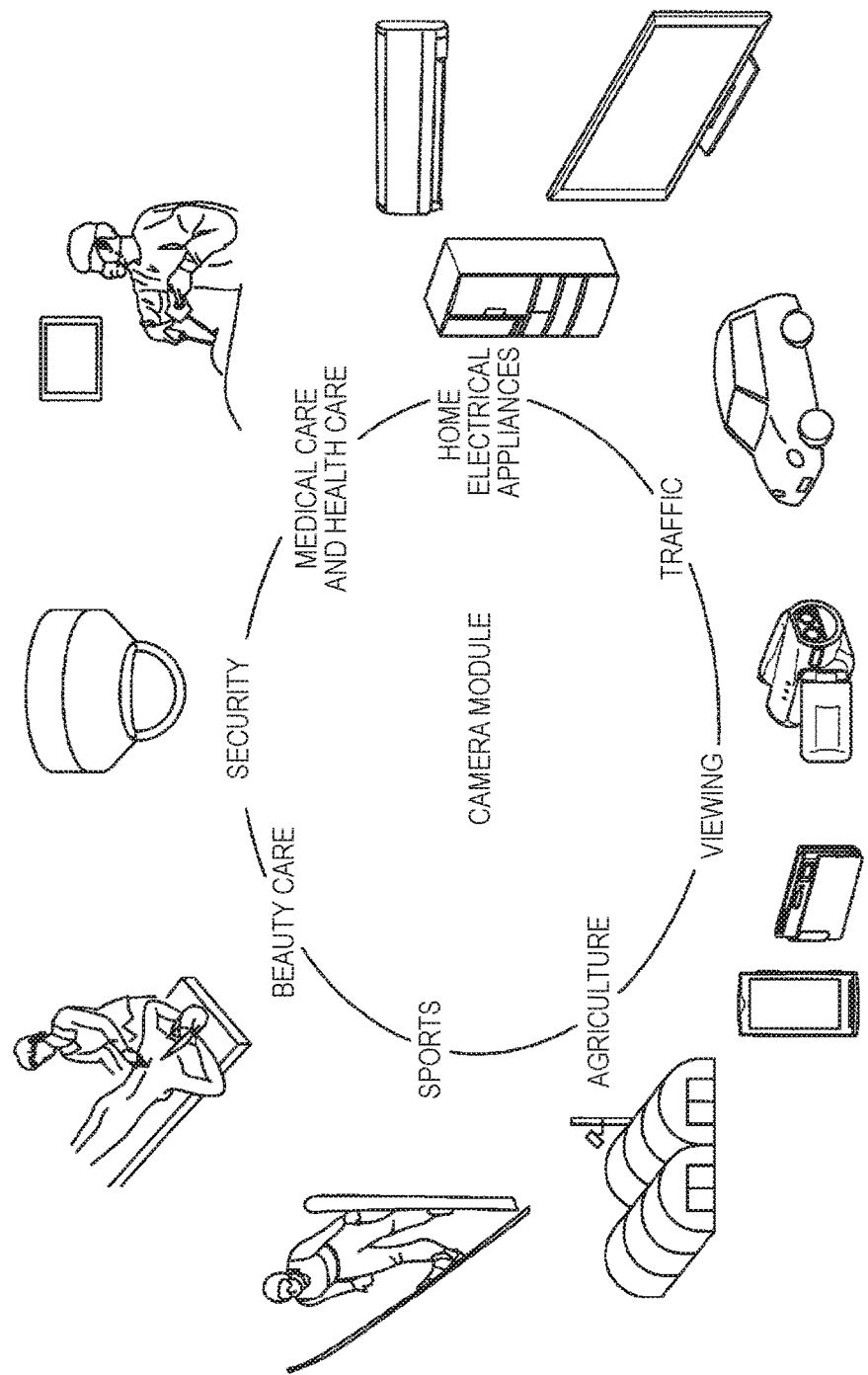
FIG. 19 is a diagram illustrating usage examples in which the camera module according to this embodiment is used.

Next, usage examples in which the above-described camera module is used will be described with reference to FIG. 19. FIG. 19 is a diagram illustrating the usage examples in which the above-described camera module is used.

The above-described camera module can be used for, for example, various electronic devices that senses light such as visible light, infrared light, ultraviolet light, or X-rays, as described below.

Electronic devices that take images used for viewing, such as a digital camera and a portable appliance with a camera function.

Electronic devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.

Electronic devices used for home electrical appliances, such as a TV, a refrigerator, and an air conditioner, to takes images of a gesture of a user and operate appliance in accordance with the gesture.

Electronic devices used for medical care and health care, such as an endoscope and a device that performs angiography by reception of infrared light.

Electronic devices used for security, such as a monitoring camera for crime prevention and a camera for personal authentication.

Electronic devices used for beauty care, such as skin measurement equipment that takes images of the skin and a microscope that takes images of the scalp.

Electronic devices used for sports, such as an action camera and a wearable camera for sports and the like.

Electronic devices used for agriculture, such as a camera for monitoring the condition of the field and crops.

10. Conclusion

As described above, the camera module according to the embodiment of the present disclosure first performs focus detection on the basis of the phase detection AF method and controls a lens position of the imaging optical system 11A (i.e., performs focusing) on the basis of a result of the focus detection. Then, the camera module according to the present embodiment waits for stabilization of a scene. At this time, in a case where a change in the scene is detected in a predetermined period of time, the camera module controls the lens position of the imaging optical system 11A again on the basis of the phase detection AF method. Further, in a case where a state in which the scene is stable (i.e., a state in which a change amount of a subject is less than a threshold) continues for a predetermined period of time or more, the camera module controls the lens position of the imaging optical system 11A (i.e., performs focusing) on the basis of the contrast detection AF method. Based on the above control, at the time of, for example, capturing an image of a moving body, the camera module according to the present embodiment can cause a focus position to track the moving body in a more suitable mode and can further improve focusing accuracy in a case where the scene is stabilized. In other words, the camera module according to the present embodiment can maintain trackability of a focus position with respect to a subject at the time of capturing a moving image or at the time of continuously taking images and can further improve focusing accuracy. As described above, the camera module according to the present embodiment can improve both trackability of a focus position and focusing accuracy with respect to a subject.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image capturing device including:

an imaging element having a light receiving surface including detection pixels that receive light passed through different regions of an exit pupil of an imaging optical system, and detect a phase difference between two images obtained by splitting the exit pupil;

a first detection unit configured to execute at least any of first focus detection based on a phase detection autofocus (AF) method and second focus detection based on a contrast detection AF method;

a focusing control unit configured to drive at least one optical member included in the imaging optical system toward a focusing position detected by the focus detection; and a second detection unit configured to detect a change in a subject image, in which, in a case where a state in which a change amount of the subject image is less than a threshold continues for a predetermined period of time or more after the first focus detection, the first detection unit executes the first focus detection or the second focus detection.

(2)
The image capturing device according to (1),
in which the first detection unit sets a parameter relating to the predetermined period of time on the basis of a result of the first focus detection executed immediately before the predetermined period of time.

(3)
The image capturing device according to (2),
in which, in a case where the first focus detection fails, the first detection unit sets, as the parameter relating to the predetermined period of time, a parameter different from a parameter used in a case where the first focus detection succeeds.

(4)
The image capturing device according to (2),
in which, in a case where the first focus detection fails, the first detection unit sets, as the parameter relating to the predetermined period of time, a parameter same as a parameter used in a case where the first focus detection succeeds.

(5)
The image capturing device according to any one of (1) to (4),
in which the first detection unit sets, on the basis of a result of the first focus detection, an amount of control of the optical member in the second focus detection executed in a case where the state in which the change amount of the subject image is less than the threshold continues for the predetermined period of time or more.

(6)
The image capturing device according to any one of (1) to (5),
in which the second detection unit detects the change in the subject image on the basis of an image capturing result of the subject image.

(7)
The image capturing device according to anyone of (1) to (6),
in which, the second detection unit detects the change in the subject image on the basis of a detection result of a position or direction of the image capturing device.

(8)
An image capturing method including:
detecting, on the basis of a result of receiving light passed through different regions of an exit pupil of an imaging optical system, a phase difference between two images obtained by splitting the exit pupil;
causing a processor to execute at least any of first focus detection based on a phase detection AF method and second focus detection based on a contrast detection AF method;
driving at least one optical member included in the imaging optical system toward a focusing position detected by the focus detection; and
detecting a change in a subject image,
in which, in a case where a state in which a change amount of the subject image is less than a threshold continues for a predetermined period of time or more after the first focus detection, the first focus detection or the second focus detection is executed.

(9)
A program for causing a computer to execute
detecting, on the basis of a result of receiving light passed through different regions of an exit pupil of an imaging optical system, a phase difference between two images obtained by splitting the exit pupil,
causing a processor to execute at least any of first focus detection based on a phase detection AF method and second focus detection based on a contrast detection AF method,
driving at least one optical member included in the imaging optical system toward a focusing position detected by the focus detection, and
detecting a change in a subject image,
in which, in a case where a state in which a change amount of the subject image is less than a threshold continues for a predetermined period of time or more after the first focus detection, the first focus detection or the second focus detection is executed.

REFERENCE SIGNS LIST 11 lens barrel
11A imaging optical system
12 optical filter
13 image sensor
14 main processing unit
15 illumination control unit
16 sensor drive unit
17 processing unit
18 image processing unit
19 focus drive unit
20 display unit
21 operation unit
22 flash memory
23 focus actuator
24 illumination unit
31 CPU
32 memory
33 ADC
34 DAC
35 I/F
50 light receiving surface
51 pixel block
52 normal pixel
53 detection pixel
53L left light-shielding pixel
53R right light-shielding pixel
61 PD
62 CL
63 color filter
64 on-chip lens
66 light-shielding film

The invention claimed is:
1. An image capturing device, comprising:
an imaging optical system;
an imaging element having a light receiving surface including detection pixels, wherein the detection pixels are configured to:
receive light passed through different regions of an exit pupil of the imaging optical system; and
detect a phase difference between two images obtained by split of the exit pupil;
circuitry configured to:
execute at least one of a first focus detection based on a phase detection autofocus (AF) method and a second focus detection based on a contrast detection AF method;
drive at least one optical member included in the imaging optical system towards a focusing position detected by the first focus detection;
detect a change in a subject image,
wherein, when a state in which a change amount of the subject image less than a threshold value continues for one of a first period of time or a second period of time more than the first period of time, subsequent to the first focus detection, one of a third focus detection based on the phase detection AF method or a fourth focus detection based on the contrast detection AF method is executed; and set a first parameter relative to the first period of time based on a result of the first focus detection executed before the first period of time.

2. The image capturing device according to claim 1, wherein, when the first focus detection fails, the circuitry is further configured to set a second parameter different from the first parameter set when the first focus detection succeeds.

3. The image capturing device according to claim 1, wherein, when the first focus detection fails, the circuitry is further configured to set a second parameter same as the first parameter set when the first focus detection succeeds.

4. The image capturing device according to claim 1, wherein the circuitry is further configured to set, based on the result of the first focus detection, an amount of control of the optical member in the second focus detection is executed when the state in which the change amount of the subject image less than the threshold value continues for one of the first period of time or the second period of time.

5. The image capturing device according to claim 1, wherein the circuitry is further configured to detect the change in the subject image based on an image capturing result of the subject image.

6. The image capturing device according to claim 1, wherein, the circuitry is further configured to detect the change in the subject image based on a detection result of one of a position or a direction of the image capturing device.

7. An image capturing method, comprising:
detecting, based on receiving light passed through different regions of an exit pupil of an imaging optical system, a phase difference between two images obtained by splitting the exit pupil;
executing at least one of a first focus detection based on a phase detection AF method and a second focus detection based on a contrast detection AF method;
driving at least one optical member included in the imaging optical system towards a focusing position detected by the first focus detection;
detecting a change in a subject image,
wherein, when a state in which a change amount of the subject image less than a threshold value continues for one of a first period of time or a second period of time more than the first period of time, subsequent to the first focus detection, one of a third focus detection based on the phase detection AF method or a fourth focus detection based on the contrast detection AF method is executed; and
setting a parameter relative to the first period of time based on a result of the first focus detection executed before the first period of time.

8. A non-transitory computer-readable medium having stored thereon computer-executable instructions that, when executed by a computer, cause the computer to execute operations, the operations comprising:
detecting, based on receiving light passed through different regions of an exit pupil of an imaging optical system, a phase difference between two images obtained by splitting the exit pupil,
executing at least one of a first focus detection based on a phase detection AF method and a second focus detection based on a contrast detection AF method,
driving at least one optical member included in the imaging optical system towards a focusing position detected by the first focus detection;
detecting a change in a subject image,
wherein, when a state in which a change amount of the subject image less than a threshold value continues for one of a first period of time or a second period of time more than the first period of time, subsequent to the first focus detection, one of a third focus detection based on the phase detection AF method or a fourth focus detection based on the contrast detection AF method is executed; and
setting a parameter relative to the first period of time based on a result of the first focus detection executed before the first period of time.

* * * * *